United States Patent
Yagi

(10) Patent No.: US 8,007,150 B2
(45) Date of Patent: Aug. 30, 2011

(54) VEHICULAR ILLUMINATION LAMP

(75) Inventor: Takayuki Yagi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 457 days.

(21) Appl. No.: 12/331,685

(22) Filed: Dec. 10, 2008

(65) Prior Publication Data

US 2009/0154185 A1    Jun. 18, 2009

(30) Foreign Application Priority Data

Dec. 12, 2007   (JP) .................................. 2007-321238

(51) Int. Cl.
*B60Q 1/04*    (2006.01)
(52) U.S. Cl. ..................... 362/520; 362/538; 362/545
(58) Field of Classification Search ............ 362/311.02, 362/311.09, 311.1, 311.14, 327, 335, 509, 362/520, 521, 522, 538, 545
See application file for complete search history.

(56) References Cited

U.S. PATENT DOCUMENTS

| | | | | |
|---|---|---|---|---|
| 7,461,960 B2 * | 12/2008 | Opolka et al. | ............... | 362/545 |
| 7,762,697 B2 * | 7/2010 | Yagi | ............................ | 362/520 |
| 2005/0018443 A1 | 1/2005 | Tsukamoto | | |
| 2007/0291499 A1 * | 12/2007 | Tanaka | ......................... | 362/509 |

* cited by examiner

*Primary Examiner* — Y My Quach Lee
(74) *Attorney, Agent, or Firm* — Osha • Liang LLP

(57) ABSTRACT

A vehicular illumination lamp includes a convex lens positioned on an optical axis in a vehicular longitudinal direction and a light emitting element positioned in a proximity of a rear side focal point of the convex lens. The vehicle lamp is configured so as to form a light distribution pattern that has a horizontal cut-off line and an oblique cut-off line in an upper end portion thereof by exercising deflection control, with a use of the convex lens, over light directly emitted from the light emitting element. The light emitting element includes a light emitting chip that has a rectangular light emitting surface.

16 Claims, 15 Drawing Sheets

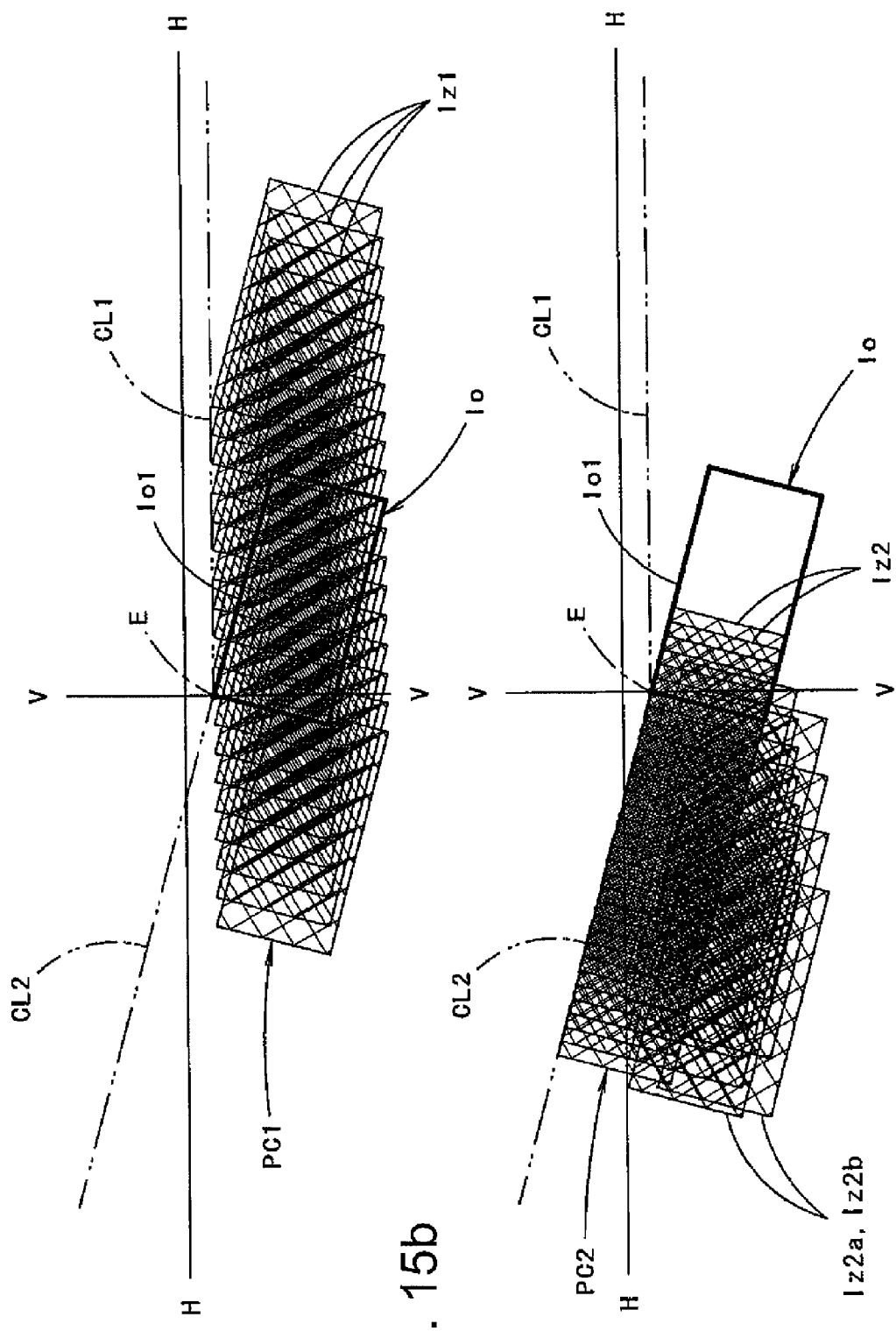

VEHICULAR ILLUMINATION LAMP

BACKGROUND OF INVENTION

1. Field of the Invention

The present invention relates to a vehicular illumination lamp that uses a light emitting element as a light source. The present invention specifically relates to a vehicular illumination lamp that is configured so as to radiate light to form a light distribution pattern having a horizontal cut-off line and an oblique cut-off line in an upper end portion thereof.

2. Related Art

In recent years, light emitting elements such as light-emitting diodes have been used as light sources in vehicular illumination lamps.

For example, "Patent Document 1" describes a vehicular illumination lamp that includes: a convex lens positioned on an optical axis extending in the front-back direction of the lamp; and a light emitting element positioned in the proximity of the rear side focal point of the convex lens. A so-called direct projection type of vehicular illumination lamp is configured so as to exercise deflection control, with the use of the convex lens, over the light directly emitted from the light emitting element.

Further, the vehicular illumination lamp described in "Patent Document 1" is configured so that a part of the light directly emitted from the light emitting element is blocked by a shade that is positioned in front of, and in the proximity of, the light emitting element in such a manner that a light distribution pattern having a horizontal cut-off line or an oblique cut-off line in the upper end portion thereof is formed.

[Patent Document 1]
United States Patent Application 2005018443

SUMMARY OF INVENTION

By using the configuration of the vehicular illumination lamp described in "Patent Document 1" listed above, it is possible to make the lamp compact. In addition, by configuring the upper end edge of the shade included in the vehicular illumination lamp so as to have an appropriate shape, it is also possible to form a light distribution pattern that has the horizontal cut-off line and the oblique cut-off line in the upper end portion thereof.

The vehicular illumination lamp described in "Patent Document 1," however, has a problem in that it is not possible to effectively utilize the luminous flux from the light source because a part of the light directly emitted from the light emitting element is blocked by the shade.

One or more embodiments of the present invention provide a direct projection type of vehicular illumination lamp that uses a light emitting element as a light source, and is able to enhance the utilization efficiency of the luminous flux from the light source, even in the case where a light distribution pattern that has a horizontal cut-off line and an oblique cut-off line in the upper end portion thereof is formed.

One or more embodiments of the present invention devise the positional arrangement of the light emitting element and the shape of the front-side surface of the convex lens that is used for exercising deflection control over the light directly emitted from the light emitting element and by providing, around the convex lens, a predetermined additional lens that is integrally formed with the convex lens.

A vehicular illumination lamp according to one or more embodiments of the present invention is a vehicular illumination lamp that includes a convex lens positioned on an optical axis in a vehicular longitudinal direction and a light emitting element positioned in the proximity of a rear side focal point of the convex lens and is configured so as to form a light distribution pattern that has a horizontal cut-off line and an oblique cut-off line in an upper end portion thereof by exercising deflection control, with the use of the convex lens, over light directly emitted from the light emitting element. The vehicular illumination lamp is characterized in that the light emitting element includes a light emitting chip that has a rectangular light emitting surface, the light emitting element is positioned facing forward in such a manner that a lower end edge of the light emitting chip is positioned on a plane that includes the optical axis, while one of end points of the lower end edge is positioned on the rear side focal point, an additional lens is provided around the convex lens, the additional lens being integrally formed with the convex lens in such a manner that the additional lens surrounds the convex lens in the manner of a band, and the additional lens has:

an incident plane that is formed generally in the shape of a circular cylindrical plane centered on an axial line passing through a position in the proximity of a light emission center of the light emitting element and being parallel to the optical axis and that causes light emitted from the light emitting element to become incident to the additional lens in such a manner that the light is refracted into a direction to draw apart from the axial line;

a reflecting plane that causes the light that has become incident from the incident plane to be internally reflected to the front; and an emission plane that causes the light that has been internally reflected on the reflecting plane to be emitted to the front as diffused light.

The aforementioned "light emitting element" denotes a light source that is in the form of an element having a light emitting chip that performs surface emission generally in the shape of a point. There is no particular limitation to the type of light emitting element to be used. For example, it is possible to use a light-emitting diode or a laser diode for the present invention. Also, as for the shape of the light emitting surface of the "light emitting chip" included in the light emitting element, there is no particular limitation to the height-to-width ratio thereof and the size thereof, as long as the light emitting surface is rectangular.

As long as the aforementioned "additional lens" is integrally formed with the convex lens in such a manner that the additional lens surrounds the convex lens in the manner of a band, the additional lens may be provided so as to surround the convex lens along the entire circumference thereof or may be provided so as to surround the convex lens throughout a range having a predetermined angle.

As long as the "incident plane" of the additional lens is formed generally in the shape of a circular cylindrical plane centered on the axial line that passes through the position in the proximity of the light emission center of the light emitting element and is parallel to the optical axis, the incident plane does not necessarily have to be formed precisely in the shape of a circular cylindrical plane. For example, another arrangement is acceptable in which the incident plane is formed so as to be slightly in the shape of a conical plane, in consideration of the draft angle of a metal mold or the like.

As for the "reflecting plane" of the additional lens, there is no particular limitation to the specific shape of the reflecting plane as long as the reflecting plane is formed so as to cause the light that has been emitted from the light emitting element and has become incident from the incident plane to be internally reflected to the front.

As for the "emission plane" of the additional lens, there is no particular limitation to the specific shape of the emission plane as long as the emission plane is formed so as to cause the light that has been internally reflected on the reflecting plane of the additional lens to be emitted to the front as diffused light.

As explained in the configurations described above, the vehicular illumination lamp according to one or more embodiments of the present invention is configured so as to form the light distribution pattern that has the horizontal cut-off line and the oblique cut-off line in the upper end portion thereof by exercising the deflection control, with the use of the convex lens, over the light directly emitted from the light emitting element that includes the light emitting chip having the rectangular light emitting surface. The light emitting element is positioned facing forward in such a manner that the lower end edge of the light emitting chip is positioned on the plane that includes the optical axis, while the one of the end points of the lower end edge is positioned on the rear side focal point of the convex lens. Thus, in one or more embodiments, it is possible to achieve one or more of the effects described below.

The light emitting element is positioned facing forward in the proximity of the rear side focal point of the convex lens. Thus, an inverted projection image of the light emitting chip will be formed on an imaginary vertical screen positioned in front of the lamp. In that situation, the light emitting chip is positioned in such a manner that the lower end edge thereof is positioned on the plane that includes the optical axis, while the one of the end points of the lower end edge is positioned on the rear side focal point of the convex lens. Accordingly, if the convex lens were supposedly a regular convex lens, the inverted projection image of the light emitting chip would be formed on the imaginary vertical screen in such a manner that one of the end points of the upper end edge would be positioned at the intersection of the imaginary vertical screen and the optical axis, while the upper end edge would be positioned on the horizontal line passing through the intersection or an inclined line that is inclined with respect to the horizontal line.

Thus, by exercising diffusion and deflection control over the light directly emitted from the light emitting element so that the light is diffused and deflected into the horizontal direction and a direction that is inclined obliquely upward, by configuring the front-side surface of the convex lens so as to have an appropriate surface shape, it is possible to form the light distribution pattern that has the horizontal cut-off line and the oblique cut-off line in the upper end portion thereof. In addition, unlike the example of the related art, it is possible to form the horizontal cut-off line and the oblique cut-off line without having to block a part of the light directly emitted from the light emitting element by using a shade. Thus, it is possible to effectively utilize the luminous flux from the light source.

In addition to these arrangements, the vehicular illumination lamp according to one or more embodiments of the present invention is configured so that the additional lens is provided around the convex lens, the additional lens being integrally formed with the convex lens in such a manner that the additional lens surrounds the convex lens in the manner of a band. The additional lens is configured so as to have: the incident plane that is formed generally in the shape of a circular cylindrical plane centered on the axial line passing through a position in the proximity of the light emission center of the light emitting element and being parallel to the optical axis and that causes light emitted from the light emitting element to become incident to the additional lens in such a manner that the light is refracted into a direction to draw apart from the axial line; the reflecting plane that causes the light that has become incident from the incident plane to be internally reflected to the front; and the emission plane that causes the light that has been internally reflected on the reflecting plane to be emitted to the front as the diffused light. Thus, in one or more embodiments, it is possible to achieve one or more of the effects described below.

In the additional lens, the incident plane is formed generally in the shape of a circular cylindrical plane centered on the axial line that passes through a position in the proximity of the light emission center of the light emitting element and is parallel to the optical axis. Thus, of the light emitted from the light emitting element, it is possible to cause a large part of the light that travels toward the space surrounding the convex lens to become incident to the additional lens and to be emitted to the front via the reflecting plane and the emission plane. As a result, it is possible to additionally form an additional light distribution pattern with the light emitted through the additional lens, in addition to a basic light distribution pattern that is formed by the light emitted through the convex lens. Consequently, it is possible to effectively utilize the luminous flux from the light source.

In such a case, the additional lens is integrally formed with the convex lens in such a manner that the additional lens surrounds the convex lens in the manner of a band. Thus, it is possible to maintain the positional relationship between the additional lens and the convex lens so as to be constant at all times. Consequently, it is possible to exercise the deflection control over the light emitted from the light emitting element with the use of the additional lens, with a high level of precision.

Further, the incident plane of the additional lens is formed generally in the shape of a circular cylindrical plane centered on the axial line that passes through a position in the proximity of the light emission center of the light emitting element and is parallel to the optical axis. Thus, it is possible to make the size of a light distribution pattern (hereinafter, it may be referred to the "reference light distribution pattern") the smallest, the reference light distribution pattern being formed in the case where the light emitted through the emission plane is supposedly configured so as to become parallel beams travelling along the optical axis. Accordingly, by exercising the diffusion control on the emission plane of the additional lens in an appropriate manner, it is possible to easily form the additional light distribution pattern having an arbitrary size and an arbitrary shape.

As explained above, according to one or more embodiments of the present invention, it is possible to enhance the utilization efficiency of the luminous flux from the light source in the direct projection type of vehicular illumination lamp that uses a light emitting element as the light source, even in the case where a light distribution pattern that has the horizontal cut-off line and the oblique-cut-off line in the upper portion thereof is formed. In addition, it is possible to further enhance the utilization efficiency of the luminous flux from the light source by additionally forming the additional light distribution pattern.

In the configurations described above, by having an arrangement in which the emitted light control is exercised on the emission plane of the additional lens so as to cause the light that has been internally reflected on the reflecting plane of the additional lens to be emitted as diffused light that is diffused to the front downwardly and in the horizontal direction, it is possible to form an additional light distribution pattern that is diffused to the left and to the right, in a position that is below and in the proximity of the horizontal cut-off line and the oblique cut-off line. In such a case, it is possible to make the size of the reference light distribution pattern the smallest. Thus, it is possible to form the additional light distribution pattern as a horizontally oblong light distribution pattern that has a small width in the up-and-down direction. Consequently, it is possible to enhance the visibility in a distant area on the road surface in front of the vehicle.

In the configurations described above, by having an arrangement in which the reflecting plane of the additional lens is formed so that the reflecting plane causes the light that has become incident from the incident plane of the additional lens to be internally reflected, as parallel beams on a plane that includes the axial line, it is possible to exercise the emitted light control on the emission plane of the additional lens, with a high level of precision.

In the configurations described above, by having an arrangement in which the surface shape of the reflecting plane of the additional lens is devised so that the reflecting plane is structured as a total reflection plane that causes the light that has become incident from the incident plane of the additional lens to be totally reflected, it is possible to eliminate the need to apply mirror surface processing to the surface of the additional lens. Consequently, it is possible to reduce the cost of the vehicular illumination lamp.

In the configurations described above, by having an arrangement in which the emission plane of the additional lens is positioned farther to the front than the rear-side surface of the convex lens is, it is possible to extend the reflecting plane of the additional lens 22 to the front by the corresponding distance. As a result, it is possible to cause a large part of the light that has become incident from the incident plane of the additional lens to be internally reflected on the reflecting plane. Consequently, it is possible to further enhance the utilization efficiency of the luminous flux from the light source.

Together with these arrangements, in one or more embodiments, by having another arrangement in which the diameter of the front end edge of the incident plane of the additional lens is configured so as to be substantially equal to the diameter of a border line between the front-side surface of the convex lens and the emission plane of the additional lens, it is possible to cause substantially the total amount of the light that has been emitted from the light emitting element and has been internally reflected on the reflecting plane of the additional lens to reach the emission plane of the additional lens, without having to reduce the area that functions as the convex lens. Consequently, it is possible to even further enhance the utilization efficiency of the luminous flux from the light source.

In the configurations described above, by having an arrangement in which an outer circumferential plane is formed on an outer circumference side of the reflecting plane of the additional lens throughout a range having a predetermined angle, the outer circumferential plane being formed generally in the shape of a circular cylindrical plane centered on the axial line and a flange part that projects in a direction orthogonal to the axial line is formed on the outer circumferential plane, it is possible to allow the additional lens to be positioned with respect to, and to be supported by, a supporting member with the use of the flange part. In addition, it is possible to perform the positioning and the supporting processes without making any impact on the optical functions of the convex lens and the additional lens. Furthermore, in such a case, it is possible to position the additional lens not only in terms of the front-back direction, but also, in terms of the up-and-down and the left-and-right directions within a plane that is orthogonal to the front-back direction and in terms of the rotation direction.

In the configurations described above, as for a specific positional arrangement of the light emitting element and a specific structure of the convex lens, it is acceptable to apply the following configurations.

As a first configuration example, an arrangement is acceptable in which the light emitting element is positioned so that the lower end edge of the light emitting chip is positioned on the horizontal plane that includes the optical axis, while the driving-lane-side end point of the lower end edge is positioned on the rear side focal point of the convex lens. As for the convex lens, an arrangement is acceptable in which a partial region of the front-side surface is structured as a horizontal-direction diffusion region that causes the light that has been emitted from the light emitting element and has reached the region to be emitted as light that is diffused in the horizontal direction, while another partial region of the front-side surface is structured as an oblique-direction diffusion region that causes the light that has been emitted from the light emitting element and has reached the region to be emitted as light that is diffused in an oblique direction that is inclined at a predetermined angle upwardly with respect to the horizontal direction toward the driving lane side.

With these arrangements, on the imaginary vertical screen, a first light distribution pattern that extends in the horizontal direction will be formed by the light emitted from the horizontal-direction diffusion region, while a second light distribution pattern that extends in the oblique direction that is inclined at the predetermined angle upwardly with respect to the horizontal direction toward the driving lane side will be formed by the light emitted from the oblique-direction diffusion region. Accordingly, the light distribution pattern that has the horizontal cut-off line and the oblique cut-off line in the upper end portion thereof is formed as a combined light distribution pattern in which the first light distribution and the second light distribution are combined.

In such a case, the first light distribution pattern is formed as a light distribution pattern in which the inverted projection image of the light emitting chip is elongated in the horizontal direction. The lower end edge of the light emitting chip extends in the horizontal direction from the rear side focal point of the convex lens. Thus, the upper end edge of the first light distribution pattern has an extremely strong light/dark contrast. Consequently, it is possible to configure the horizontal cut-off line so as to be distinct.

As a second configuration example, an arrangement is acceptable in which the light emitting element is positioned so that the lower end edge of the light emitting chip is positioned on an inclined plane that is inclined at a predetermined angle upwardly with respect to the horizontal plane that includes the optical axis toward the driving lane side, while the oncoming-traffic-lane-side end point of the lower end edge is positioned on the rear side focal point of the convex lens. As for the convex lens, an arrangement is acceptable in which a partial region of the front-side surface is structured as the horizontal-direction diffusion region that causes the light that has been emitted from the light emitting element and has reached the region to be emitted as light that is diffused in the horizontal direction, while another partial region of the front-side surface is structured as the oblique-direction diffusion region that causes the light that has been emitted from the light emitting element and has reached the region to be emitted as light that is diffused in an oblique direction that is inclined at the predetermined angle upwardly with respect to the horizontal direction toward the driving lane side.

With these arrangements, on the imaginary vertical screen, a first light distribution pattern that extends in the horizontal direction will be formed by the light emitted from the horizontal-direction diffusion region, while a second light distribution pattern that extends in an oblique direction that is inclined at the predetermined angle upwardly with respect to the horizontal direction toward the driving lane side will be formed by the light emitted from the oblique-direction diffusion region. Accordingly, the light distribution pattern that has the horizontal cut-off line and the oblique cut-off line in the upper end portion thereof is formed as a combined light distribution pattern in which the first light distribution and the second light distribution are combined.

In such a case, the second light distribution pattern is formed as a light distribution pattern in which the inverted projection image of the light emitting chip is elongated in an inclined direction that is inclined at the predetermined angle upwardly with respect to the horizontal direction toward the driving lane side. The lower end edge of the light emitting chip extends in the inclined direction from the rear side focal point of the convex lens. Thus, the upper end edge of the second light distribution pattern has an extremely strong light/dark contrast. Consequently, it is possible to configure the oblique cut-off line so as to be distinct.

Other aspects and advantages of the invention will be apparent from the following description, the drawings and the claims.

BRIEF DESCRIPTION OF DRAWINGS

FIG. 9 is a drawing that is similar to FIG. 8 and shows the basic light distribution pattern and the additional light distribution pattern mentioned above separately from each other; FIG. 9(a) shows the basic light distribution pattern, whereas

FIG. 10(a) is a drawing that shows, in detail, a first light distribution pattern that constitutes a part of the basic light distribution pattern, whereas

FIG. 15(a) is a drawing that shows, in detail, a first light distribution pattern that constitutes one part of the basic light distribution pattern shown in FIG. 14, whereas FIG. 15(b) is a drawing that shows, in detail, a second light distribution pattern that constitutes another part of the basic light distribution pattern shown in FIG. 14.

DETAILED DESCRIPTION

Hereafter, embodiments of the present invention will be explained with reference to the accompanying drawings.

First, a first embodiment of the present invention will be explained.

Figure 1:
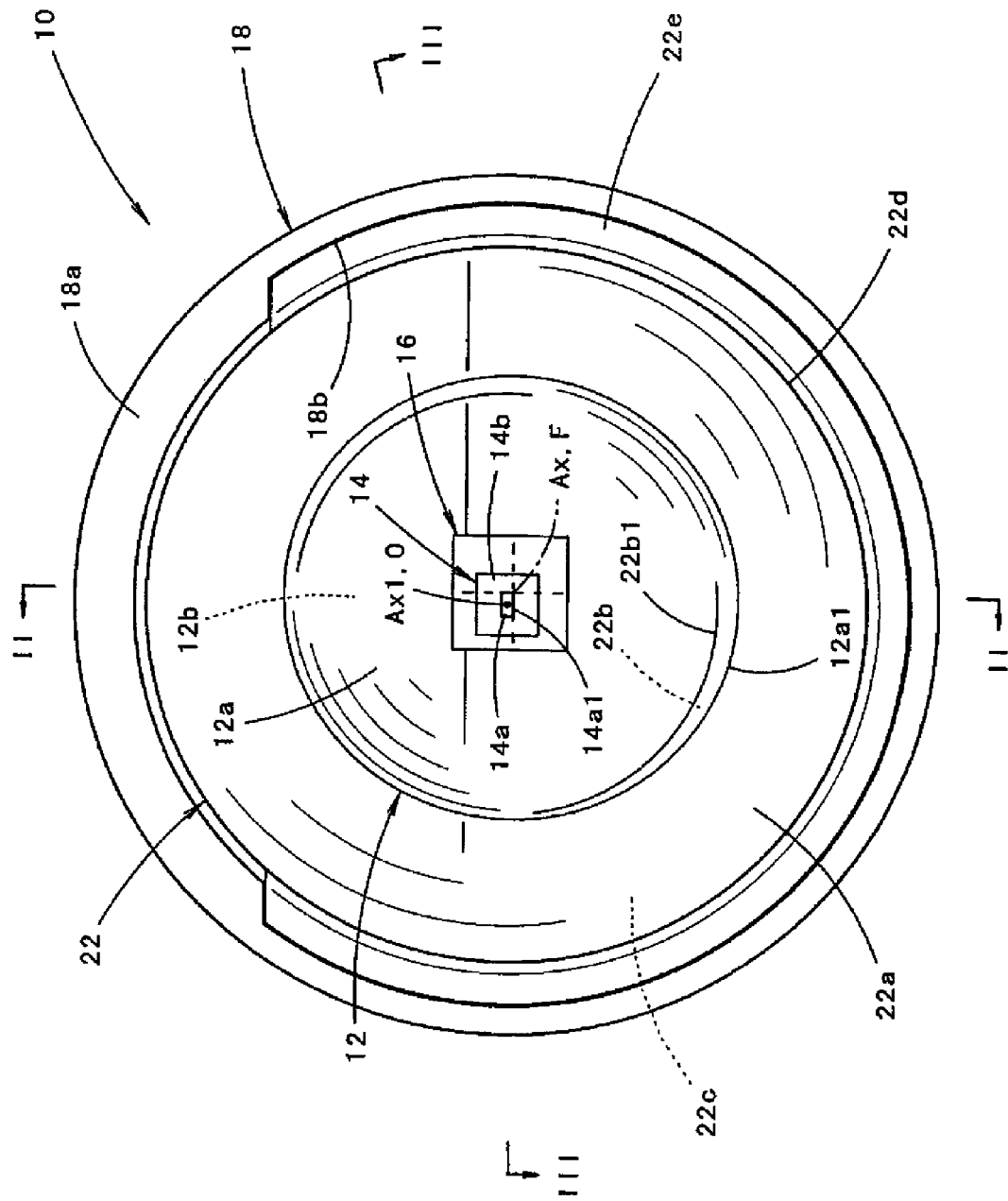
FIG. 1 is a front view that shows a vehicular illumination lamp according to a first embodiment of the present invention.
Figure 2:
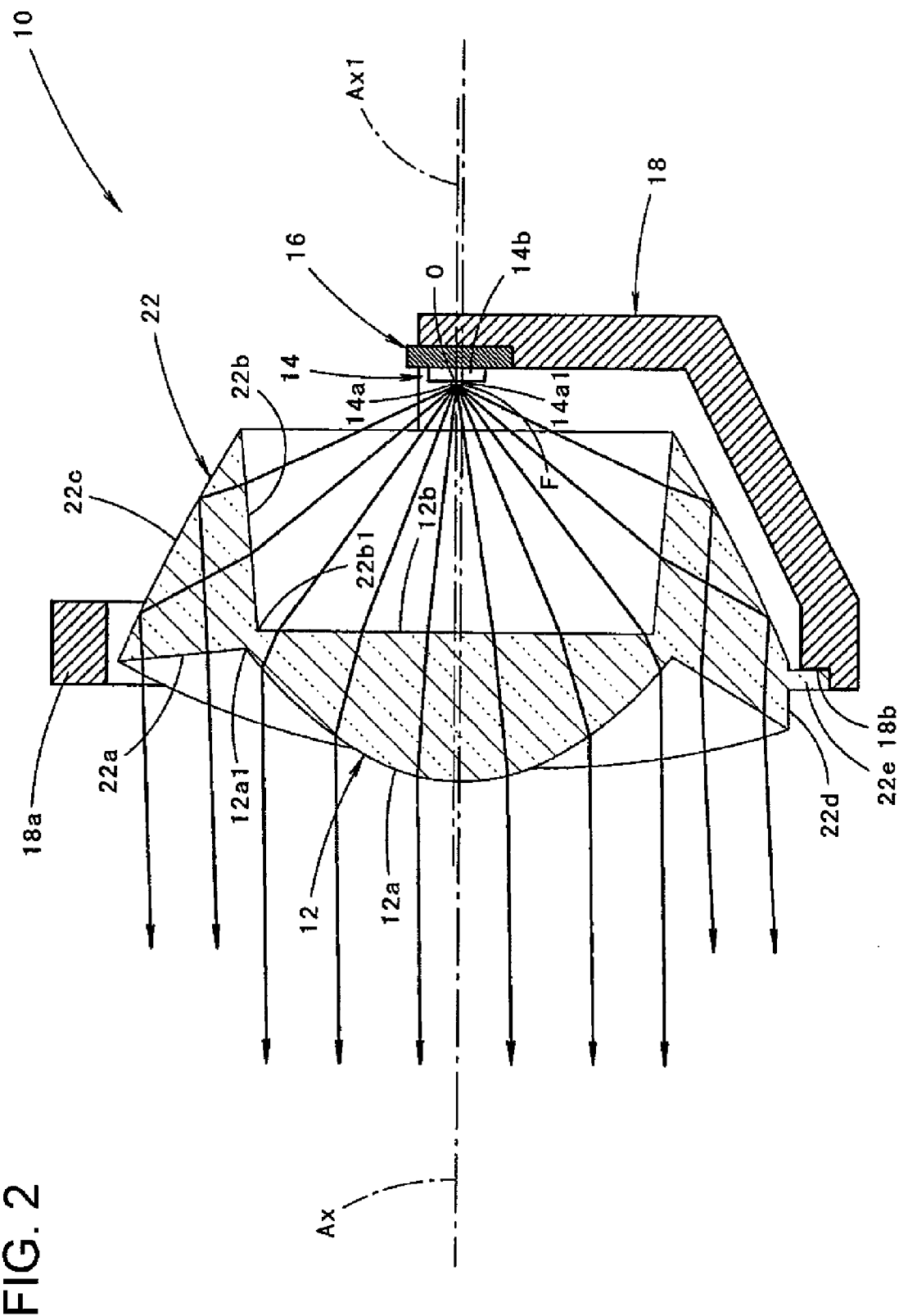
FIG. 2 is a cross-sectional view at the line II-II in FIG. 1.
Figure 3:
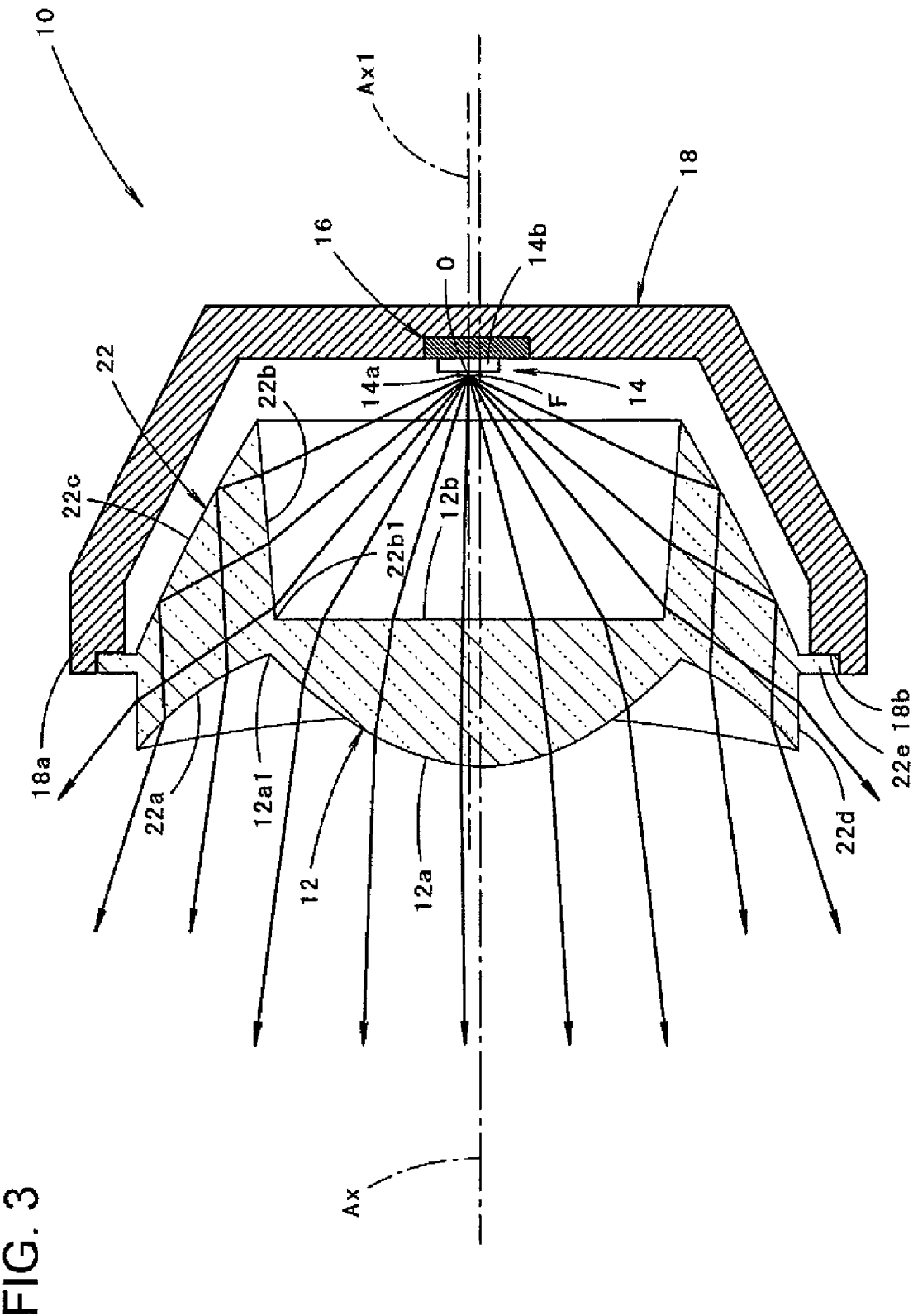
FIG. 3 is a cross-sectional view at the line III-III in FIG. 1.

FIG. 1 is a front view that shows a vehicular illumination lamp 10 according to a first embodiment of the present invention. FIG. 2 is a cross-sectional view at the line II-II in FIG. 1. FIG. 3 is a cross-sectional view at the line III-III in FIG. 1.

As shown in these drawings, the vehicular illumination lamp 10 according to the present embodiment includes: a convex lens 12 positioned on an optical axis Ax extending in the vehicular longitudinal direction; an additional lens 22 that is integrally formed with the convex lens 12 in such a manner that the additional lens 22 surrounds the convex lens 12 in the manner of a band along the entire circumference thereof; a light emitting element 14 that is positioned in the proximity of a rear side focal point F of the convex lens 12; a metal plate 16 that supports the light emitting element 14; and a supporting member 18 that is made of metal and positions and supports the metal plate 16 and the additional lens 22. The vehicular illumination lamp 10 is configured so as to be used as a lamp unit in a vehicular head lamp while being incorporated in a lamp body or the like (not shown in the drawings) in such a manner that the optical axis thereof is adjustable.

When the adjustment of the optical axis thereof has been completed, the vehicular illumination lamp 10 is positioned in such a manner that the optical axis Ax extends in a downward direction at an angle of approximately 0.5 degrees to 0.6 degrees with respect to the vehicular longitudinal direction.

Figure 4:
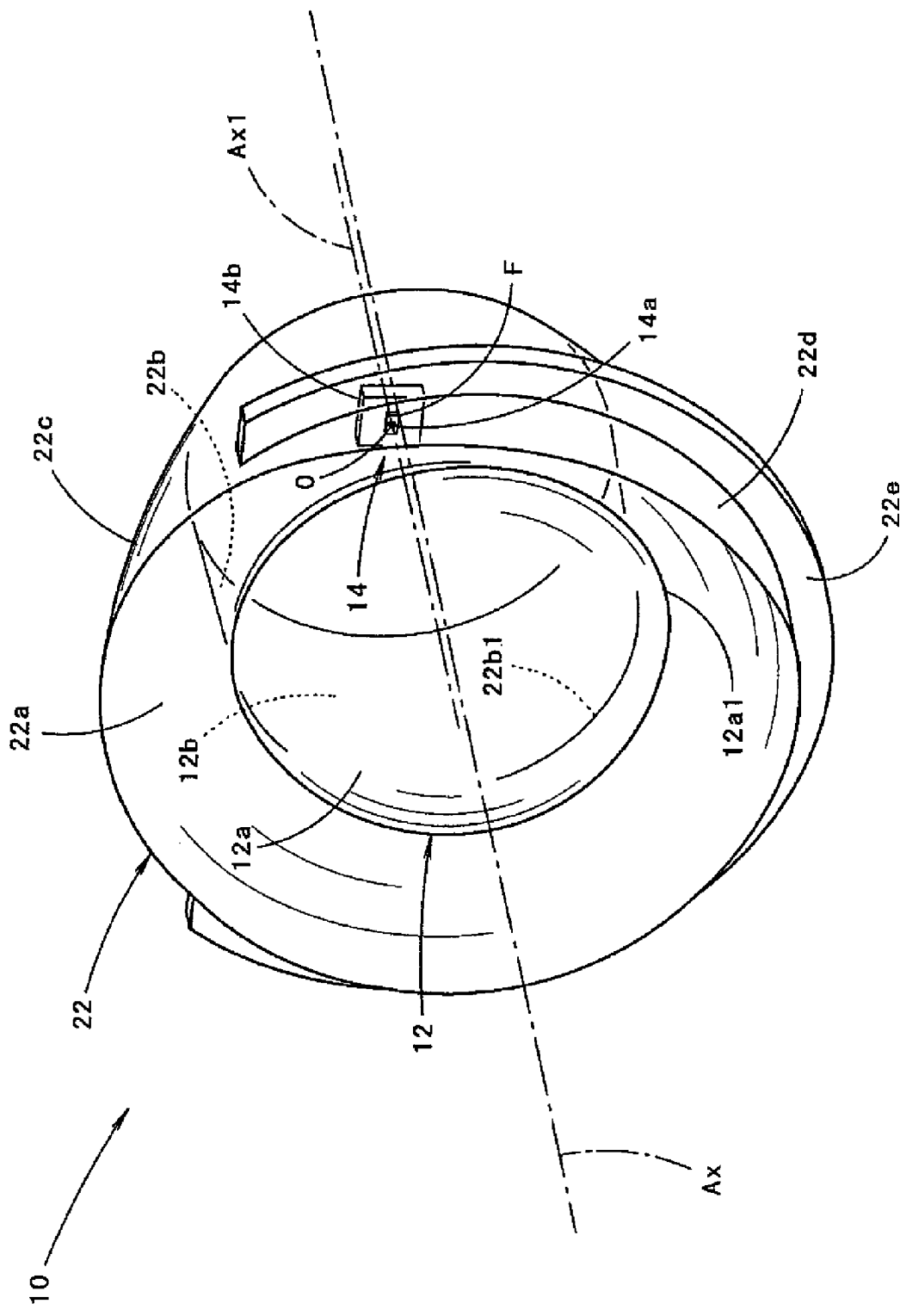
FIG. 4 is a perspective view that shows a convex lens, an additional lens, and a light emitting element included in the aforementioned vehicular illumination lamp.

FIG. 4 is a perspective view that shows the convex lens 12, the additional lens 22, and the light emitting element 14 included in the vehicular illumination lamp 10.

As shown in the drawing, the convex lens 12 is a convex lens in which the front-side surface 12a has a convex plane and the rear-side surface 12b has a flat plane and that has a shape like a plano convex aspherical lens. The convex lens 12 is positioned on the optical axis Ax. In such a case, as for the front-side surface 12a of the convex lens 12, the cross section thereof along the vertical plane that includes the optical axis Ax is a cross section of the front-side surface of a piano convex aspherical lens; however, the cross sections other than the cross section along the vertical plane are somewhat different from the cross sections of the front-side surface of a piano convex aspherical lens. Accordingly, more specifically, the rear side focal point F of the convex lens 12 denotes a rear side focal point within the vertical plane that includes the optical axis Ax. The details of the front-side surface 12a of the convex lens 12 will be described later.

The light emitting element 14 is a white light-emitting diode and includes: a light emitting chip 14a having a light emitting surface that is in the shape of a horizontally oblong rectangle (e.g., a rectangle that is approximately 1 millimeter high and 2 millimeters wide); and a base plate 14b that supports the light emitting chip 14a. In such a case, the light emitting chip 14a is sealed by a thin film that is formed so as to cover the light emitting surface.

The light emitting element 14 is positioned facing forward in such a manner that a lower end edge 14a1 of the light emitting chip 14a is positioned on the horizontal plane that includes the optical axis Ax, while the end point of the lower end edge 14a1 on the driving lane side (i.e., the left-hand side, which is the right-hand side in a front view of the lamp) is positioned on the rear side focal point F of the convex lens 12.

The additional lens 22 has: an incident plane 22b that is formed generally in the shape of a circular cylindrical plane centered on an axial line Ax1 passing through the light emission center O of the light emitting element 14 and being parallel to the optical axis Ax (which is the center of the light emitting chip 14a in a front view of the lamp) and that causes the light emitted from the light emitting element 14 to become incident to the additional lens 22 in such a manner that the light is refracted into a direction that draws apart from the axial line Ax1; a reflecting plane 22c that causes the light that has become incident from the incident plane 22b to be internally reflected to the front and an emission plane 22a that causes the light that has been internally reflected on the reflecting plane 22c to be emitted to the front as diffused light.

The reflecting plane 22c of the additional lens 22 is structured with a curved plane that is rotationally symmetric with respect to the axial line Ax1. The reflecting plane 22c is formed so as to cause the light from the light emitting element 14 that has become incident from the incident plane 22b and has reached the reflecting plane 22c to be internally reflected, as parallel beams that travel in directions to slightly draw closer to the axial line Ax1, within a plane that includes the axial line Ax1. In such a case, the reflecting plane 22c is structured as a total reflection plane that causes the light coming through the incident plane 22b to be totally reflected.

The emission plane 22a of the additional lens 22 is positioned farther to the front than the rear-side surface 12b of the convex lens 12 is. Further, the diameter of the front end edge 22b1 (i.e., the border line between the incident plane 22b of the additional lens 22 and the rear-side surface 12b of the convex lens 12) of the incident plane 22b of the additional lens 22 is configured so as to be substantially equal to the diameter of the border line 12a1 between the front-side surface 12a of the convex lens 12 and the emission plane 22a of the additional lens 22.

An outer circumferential plane 22d that is generally in the shape of a circular cylindrical plane centered on the axial line Ax1 is formed on the outer circumference side of the reflecting plane 22c of the additional lens 22 throughout a range having a predetermined angle. (More specifically, the outer circumferential plane 22d is formed throughout the area excluding a partial area positioned above the axial line Ax1.) A flange part 22e that projects in the direction orthogonal to the axial line Ax1 is formed on the outer circumferential plane 22d.

The supporting member 18 is positioned so that while positioning and supporting the metal plate 16, the supporting member 18 surrounds generally the lower half portions of the convex lens 12 and the additional lens 22 from the rear side thereof. The front end portion of the supporting member 18 is structured as a ring part 18a that surrounds the additional lens 22 along the entire circumference thereof. A positioning recessed part 18b is formed in the ring part 18a, the positioning recessed part 18b being formed so as to be centered on the optical axis Ax and extend throughout a range having a predetermined angle.

The convex lens 12 and the additional lens 22 are positioned with respect to, and supported by, the supporting member 18, as the flange part 22e of the additional lens 22 is fitted into the positioning recessed part 18b. In such a case, the convex lens 12 and the additional lens 22 are positioned in terms of the front-back direction as well as in terms of the up-and-down and the left-and-right directions within a plane that is orthogonal to the front-back direction and in terms of the rotation direction.

Figure 5:
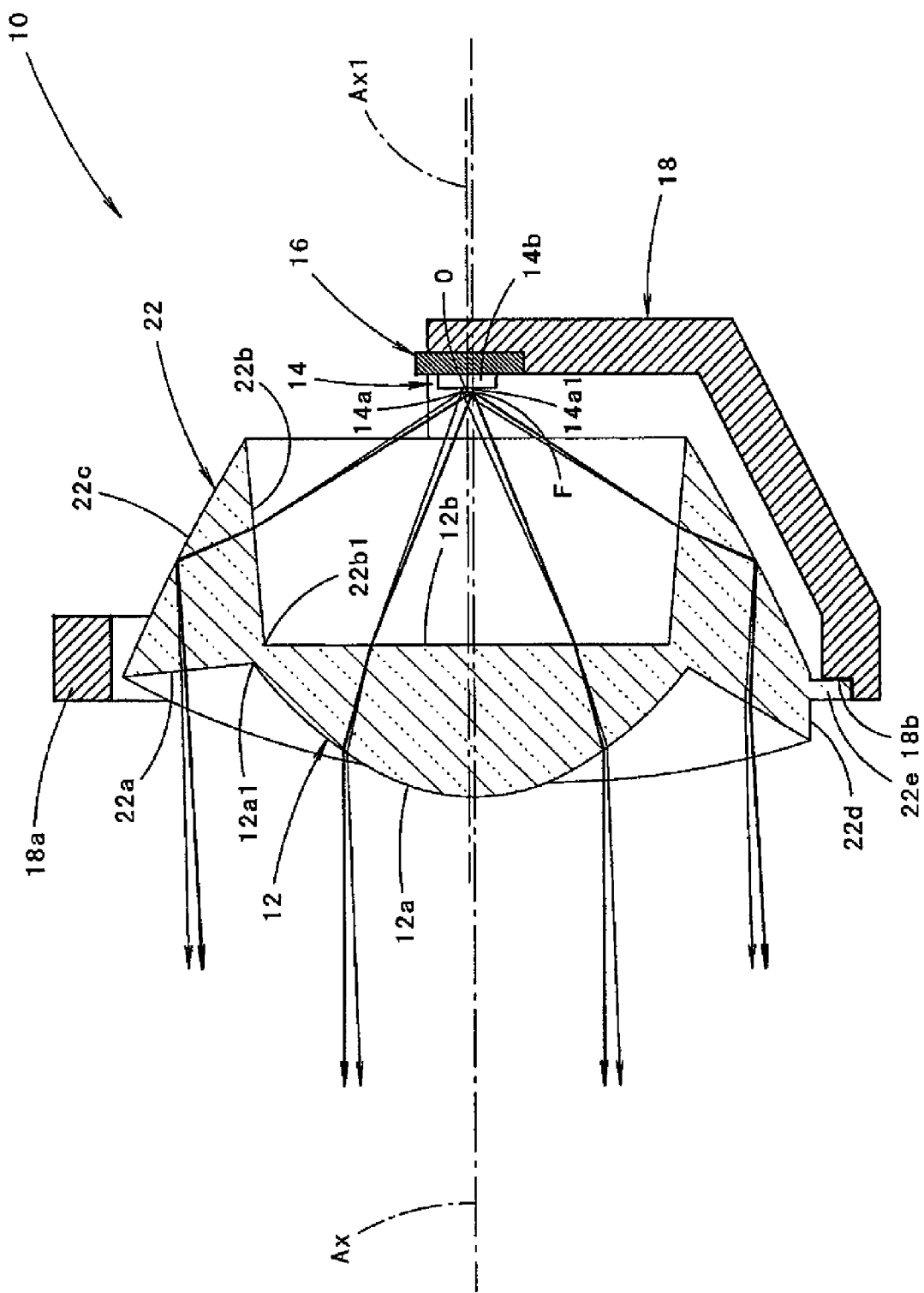
FIG. 5 is a drawing that is similar to FIG. 2 and shows light paths of the light emitted from the light emitting element included in the aforementioned vehicular illumination lamp.
Figure 6:
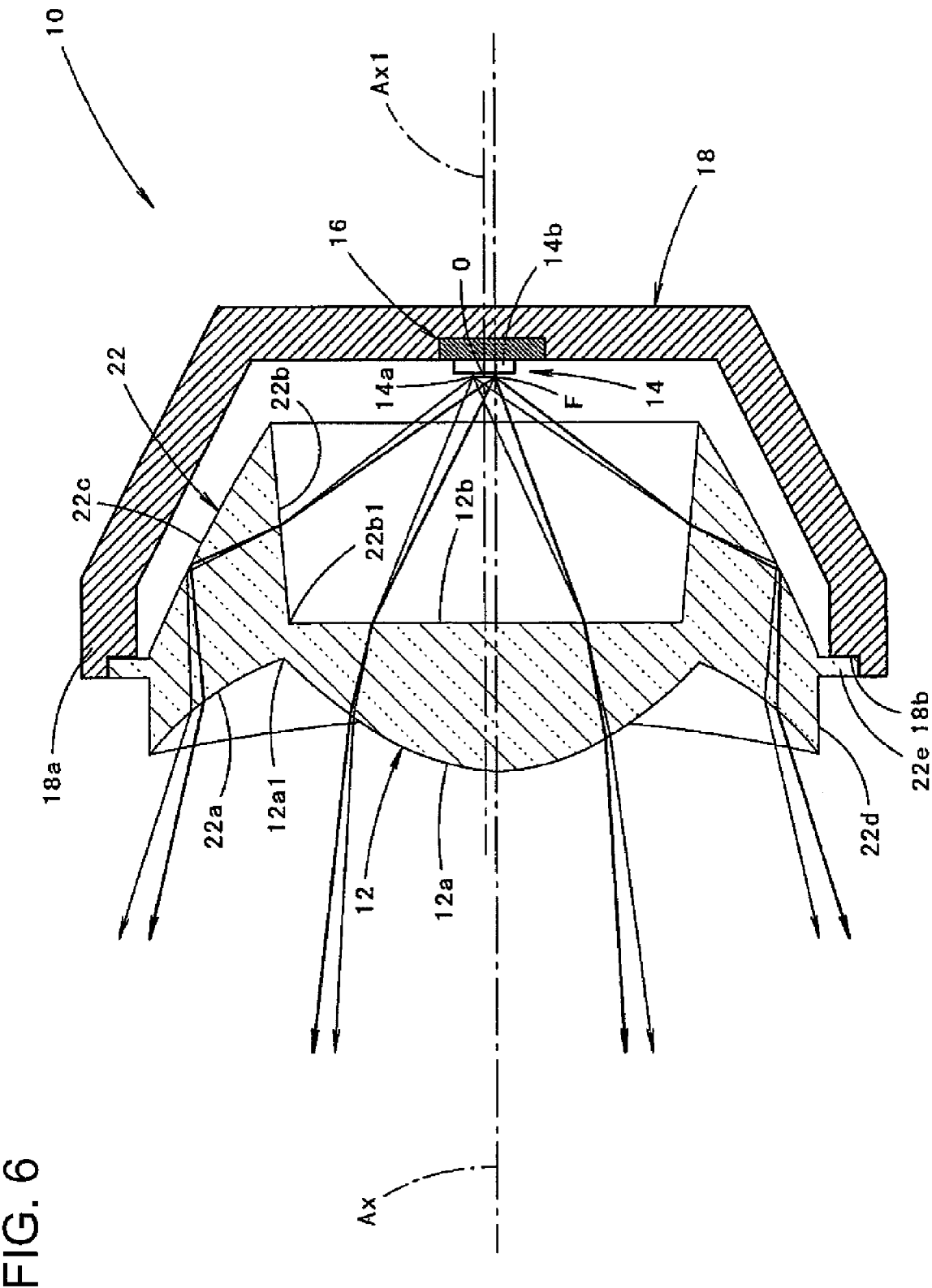
FIG. 6 is a drawing that is similar to FIG. 3 and shows light paths of the light emitted from the light emitting element included in the aforementioned vehicular illumination lamp.

FIGS. 5 and 6 are drawings that are similar to FIGS. 2 and 3 and show the light paths of the light emitted from the light emitting element 14.

Although FIGS. 2 and 3 show the light paths of the light emitted from the light emission center O of the light emitting element 14, FIG. 5 shows the light paths of the light emitted from the positions on the upper and the lower end edges of the light emitting chip 14a included in the light emitting element 14, whereas FIG. 6 shows the light paths of the light emitted from the positions on the left and the right end edges of the light emitting chip 14a included in the light emitting element 14.

As shown in the drawings, the light that has become incident to the convex lens 12 from the light emitting element 14 is emitted as parallel beams that travel slightly downward in terms of the up-and-down direction, is emitted as light that is somewhat diffused into a right horizontal direction in terms of the left-and-right direction, and is emitted as light that is somewhat diffused in an upper left oblique direction.

On the other hand, the light that has become incident to the additional lens 22 from the light emitting element 14 is emitted as parallel beams that travel slightly more downward than the light emitted through the convex lens 12 in terms of the up-and-down direction and is emitted as light that is diffused more to the left and to the right than the light emitted through the convex lens 12 in terms of the left-and-right direction. To realize this configuration, the emission plane 22a of the additional lens 22 is structured with a continuously curved plane so that the lower region thereof is more inclined to the front, outwardly in terms of the radial direction of the axial line Ax1 than the upper region thereof is and so that the left-side region thereof and the right-side region thereof are even more inclined to the front, outwardly in terms of the radial direction of the axial line Ax1 than the lower region thereof is.

Figure 7:
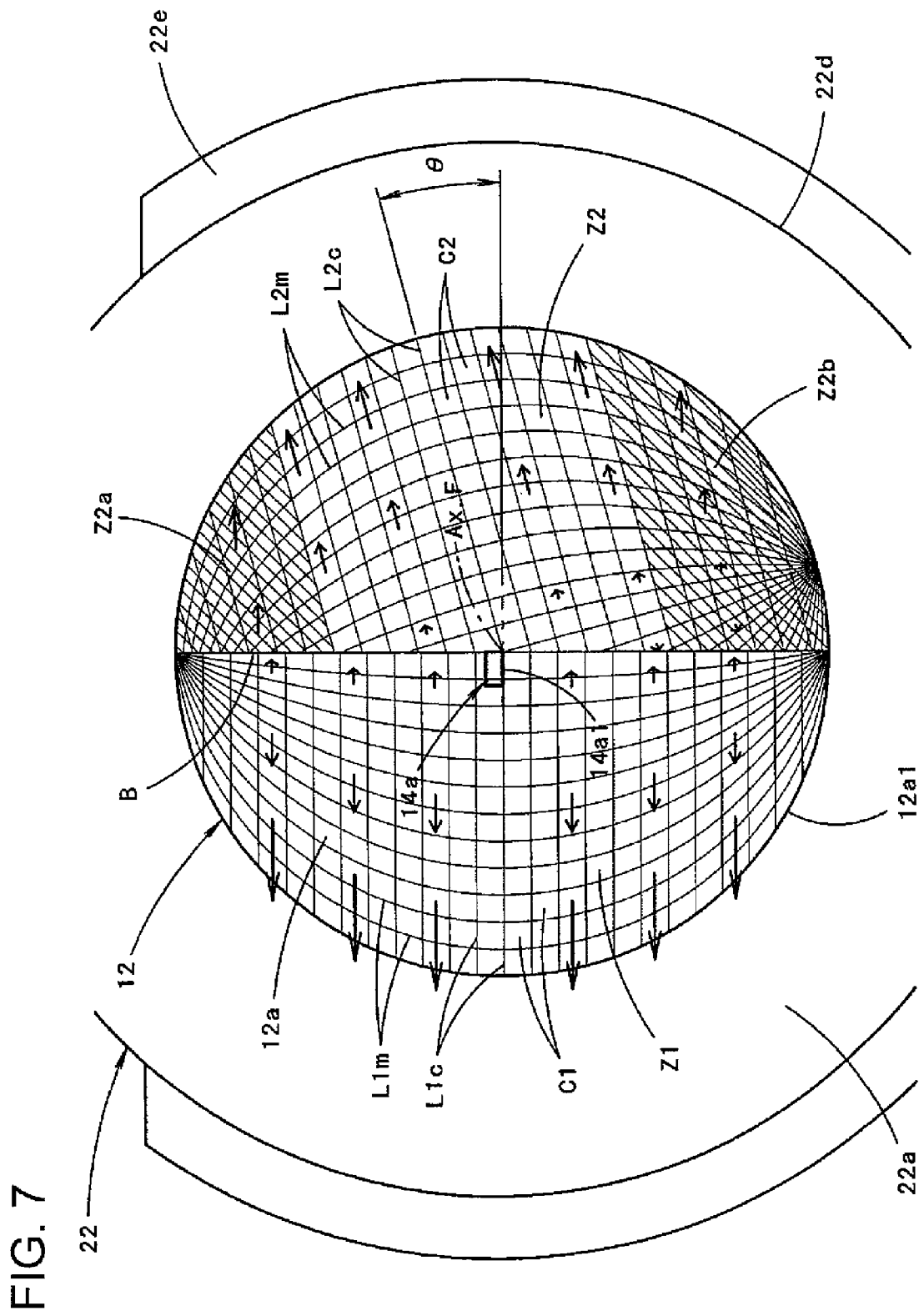
FIG. 7 is an enlarged view of an essential part in FIG. 1 in which the convex lens included in the aforementioned vehicular illumination lamp is shown together with a light emitting chip.

FIG. 7 is an enlarged view of an essential part in FIG. 1 in which the convex lens 12 is shown together with the light emitting chip 14a.

As shown in the drawing, of the front-side surface 12a of the convex lens 12, the entirety of one region that is positioned on the oncoming-traffic lane side (i.e., the right-hand side, which is the left-hand side in a front view of the lamp) with respect to the vertical plane that includes the optical axis Ax is structured as a horizontal-direction diffusion region Z1, whereas the entirety of the other region that is positioned on the driving lane side with respect to the vertical plane that includes the optical axis Ax is structured as an oblique-direction diffusion region Z2.

The horizontal-direction diffusion region Z1 is configured so as to cause the light that has been emitted from the light emitting element 14 and has reached the region Z1 to be emitted as light that is diffused in the horizontal direction. On the other hand, the oblique-direction diffusion region Z2 is configured so as to cause the light that has been emitted from the light emitting element 14 and has reached the region Z2 to be emitted as light that is diffused in an oblique direction that is inclined at a predetermined angle of θ (for example, θ=15°) upwardly with respect to the horizontal direction, toward the driving lane side.

In this situation, diffusion control is exercised over the emitted light from the horizontal-direction diffusion region Z1 by specifying the direction of the emitted light for each position in the horizontal-direction diffusion region Z1.

In other words, as shown in FIG. 7, the horizontal-direction diffusion region Z1 is divided into a plurality of cells C1 that are defined by a plurality of curved lines L1c that extend horizontally while having regular intervals therebetween in the up-and-down direction and a plurality of curved lines L1m that extend in the manner of the meridians from the upper end point to the lower end point of a border line B between the horizontal-direction diffusion region Z1 and the oblique-direction diffusion region Z2. The direction in which the light is emitted is specified for each of the cells C1.

More specifically, as shown with the arrows in FIG. 7, in some of the cells C1 that are positioned close to the border line B, the emitted light is directed slightly to the left; in some of the cells C1 that are positioned close to the outer circumferential edge of the convex lens 12, the emitted light is directed to the right at a somewhat large angle; and in some of the cells C1 that are positioned in between, the emitted light is directed into a direction in between. In such a case, the direction of the emitted light is gradually varied within the horizontal planes, in a step-by-step manner from the cells C1 that are positioned adjacent to the border line B to the cells C1 that are positioned adjacent to the outer circumferential edge of the convex lens 12.

On the other hand, as explained with the example in the horizontal-direction diffusion region Z1, diffusion control is also exercised over the emitted light from the oblique-direction diffusion region Z2 by specifying the direction of the emitted light for each position in the oblique-direction diffusion region Z2.

In other words, as shown in FIG. 7, the oblique-direction diffusion region Z2 is divided into a plurality of cells C2, and the direction in which the light is emitted is specified for each of the cells C2. It should be noted, however, that in the oblique-direction diffusion region Z2, curved lines L2c and curved lines L2m dividing the region Z2 into the plurality of cells C2 extend so as to be inclined at an angle of θ with respect to the curved lines L1c and L1m in the horizontal-direction diffusion region Z1, in the counterclockwise direction around the optical axis Ax, in a front view of the lamp.

In addition, as shown with the arrows in FIG. 7, in some of the cells C2 that are positioned close to the border line B, the emitted light is directed a little to the left along the curved line L2c; in some of the cells C2 that are positioned close to the outer circumferential edge of the convex lens 12, the emitted light is directed to the left at a slightly large angle; and in some of the cells C2 that are positioned in between, the emitted light is directed into a direction in between. In such a case, the direction of the emitted light is gradually varied within inclined planes that are inclined at an angle of θ with respect to the horizontal plane, in a step-by-step manner from the cells C2 that are positioned adjacent to the border line B to the cells C2 that are positioned adjacent to the outer circumferential edge of the convex lens 12. It should be noted, however, that in some of the cells C2 provided in a sector-shaped area defined by a curved line L2m extending obliquely downward from the optical axis Ax and the border line B, the emitted light is directed slightly to the right along the curved line L2c.

The oblique-direction diffusion region Z2 is configured, in an upper region Z2a and a lower region Z2b (shown with hatching in FIG. 7), so as to cause the light that has been emitted from the light emitting element 14 and has reached the region Z2 to be emitted as light that is diffused downwardly (more specifically, downwardly with respect to the aforementioned inclined planes). In such a case, each of the downward deflection amounts for the emitted light in the cells C2 is configured so that the closer the cell C2 is positioned to the upper end point of the border line B and the lower end point of a curved line L2m extending obliquely downward from the optical axis Ax, the larger the deflection amount is.

As shown with bold arrows in FIGS. 5 and 6, each of the arrows that extend from the center positions of the cells C1 and C2 in FIG. 7 indicates the direction in which the light is emitted from the corresponding one of the cells C1 and C2, the light having become incident to the convex lens 12 from the driving-lane-side end point (i.e., the position of the rear side focal point F of the convex lens 12) of the lower end edge 14a1 of the light emitting chip 14a.

As a result of configuring the front-side surface 12a of the convex lens 12 as described above, the front-side surface 12a has a surface shape having discontinuity at the border line B between the horizontal-direction diffusion region Z1 and the oblique-direction diffusion region Z2. The border line B is thus formed as a ridge line.

Figure 8:
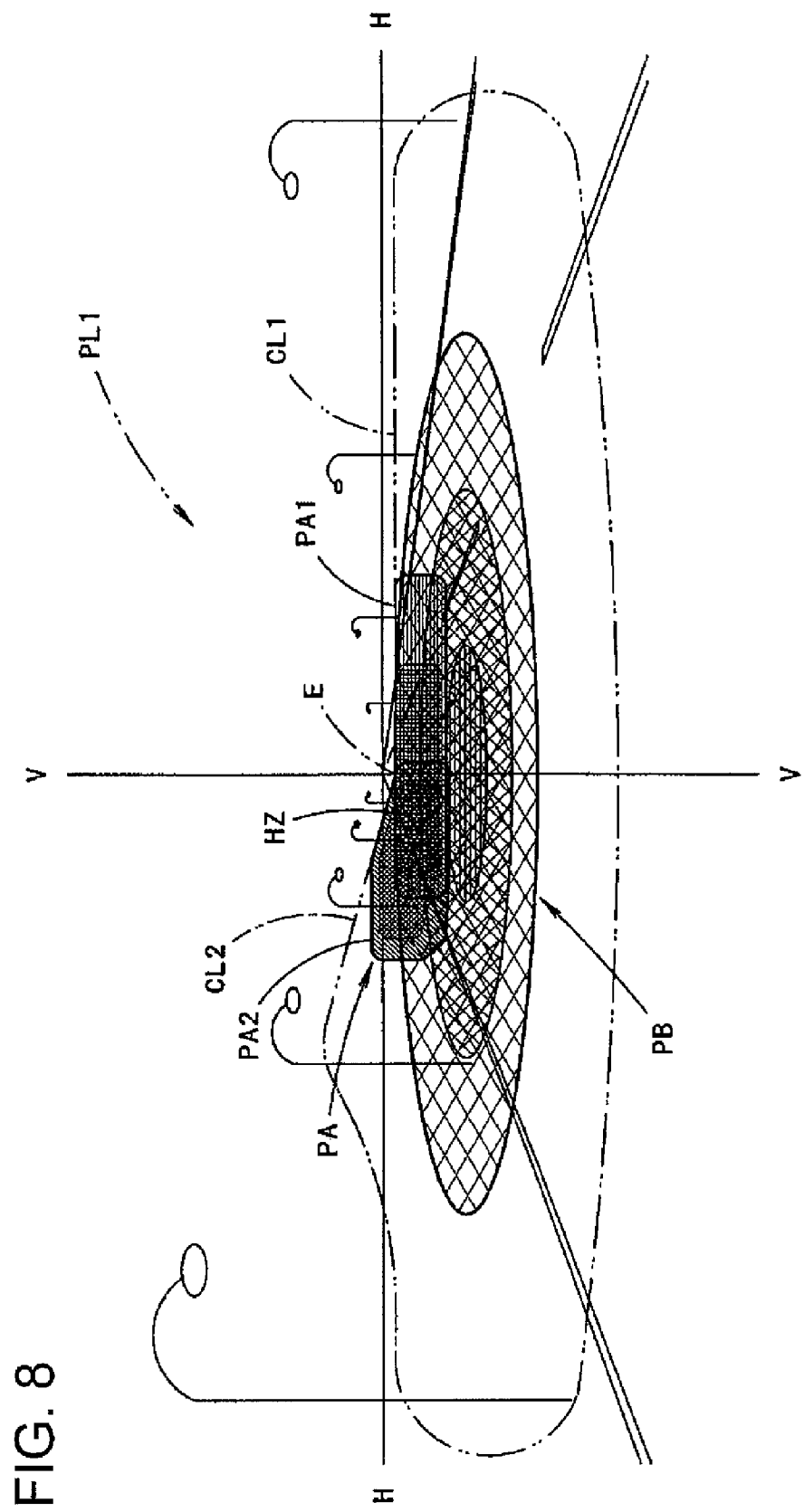
FIG. 8 is a drawing that perspectively shows a basic light distribution pattern and an additional light distribution pattern that are formed on an imaginary vertical screen positioned 25 meters in front of the lamp, by the light radiated to the front from the aforementioned vehicular illumination lamp.

FIG. 8 is a drawing that perspectively shows a basic light distribution pattern PA and an additional light distribution pattern PB that will be formed on an imaginary vertical screen positioned 25 meters in front of the lamp, by the light radiated to the front from the vehicular illumination lamp 10 according to the present embodiment.

As shown in the drawing, the basic light distribution pattern PA and the additional light distribution pattern PB are formed as parts of a low-beam distribution pattern PL1 indicated with a dashed double-dotted line. In such a case, the basic light distribution pattern PA is a light distribution pattern that is formed by the light emitted through the convex lens 12, whereas the additional light distribution pattern PB is a light distribution pattern that is formed by the light emitted through the additional lens 22. The low-beam distribution pattern PL1 is formed as a combined light distribution pattern in which the basic light distribution pattern PA, the additional light distribution pattern PB, and one or more other light distribution patterns that are formed by the light radiated to the front from other lamp units (not shown in the drawings) are combined.

The low-beam distribution pattern PL1 is a low-beam distribution pattern for left-side light distribution and has a horizontal cut-off line CL1 and an oblique cut-off line CL2 in an upper end portion thereof In such a case, with respect to a vertical line V-V that passes through a vanishing point H-V in the forward direction of the lamp, the horizontal cut-off line CL1 is formed on the oncoming-traffic lane side, whereas the oblique cut-off line CL2 is formed on the driving lane side. An elbow point E that is the intersection of the cut-off lines CL1 and CL2 is positioned below the vanishing point H-V in the forward direction of the lamp by approximately 0.5 degrees to 0.6 degrees. Further, in the low-beam distribution pattern PL1, a hot zone HZ, which is an area of high-intensity light, is formed so as to surround the elbow point E on the left side thereof.

Figure 9A:
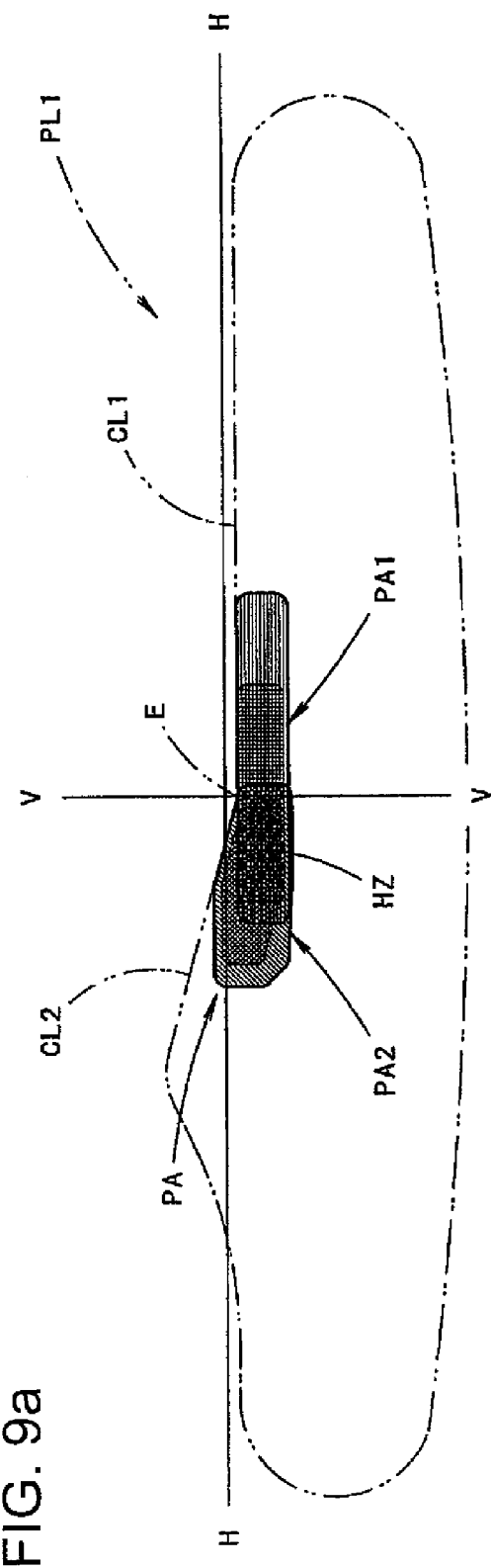
Figure 9B:
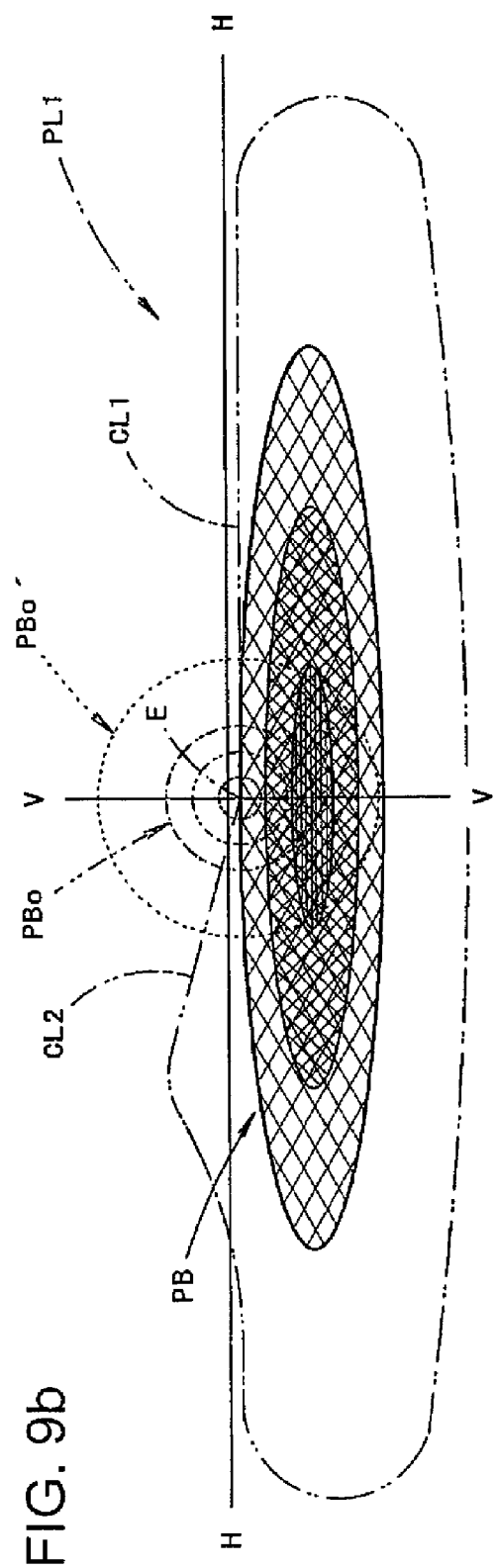
FIG. 9(b) shows the additional light distribution pattern.

FIG. 9 is a drawing that is similar to FIG. 8 and shows the basic light distribution pattern PA and the additional light distribution pattern PB separately from each other. FIG. 9(a) shows the basic light distribution pattern PA, whereas FIG. 9(b) shows the additional light distribution pattern PB.

As shown in FIG. 9(a), the basic light distribution pattern PA is formed as a combined light distribution pattern in which a first light distribution pattern PA1 and a second light distribution pattern PA2 are combined.

The light distribution pattern PA1 is a light distribution pattern that is formed by the light emitted from the horizontal-direction diffusion region Z1 on the front-side surface 12a of the convex lens 12. The light distribution pattern PA1 is formed so that the upper end edge thereof generally matches the horizontal cut-off line CL1. On the other hand, the light distribution pattern PA2 is a light distribution pattern that is formed by the light emitted from the oblique-direction diffusion region Z2 on the front-side surface 12a of the convex lens 12. The light distribution pattern PA2 is formed so that the upper end edge thereof generally matches the oblique cut-off line CL2. Further, the hot zone HZ in the low-beam distribution pattern PL is formed generally in the area in which the two light distribution patterns PA1 and PA2 overlap each other.

Figure 10A:
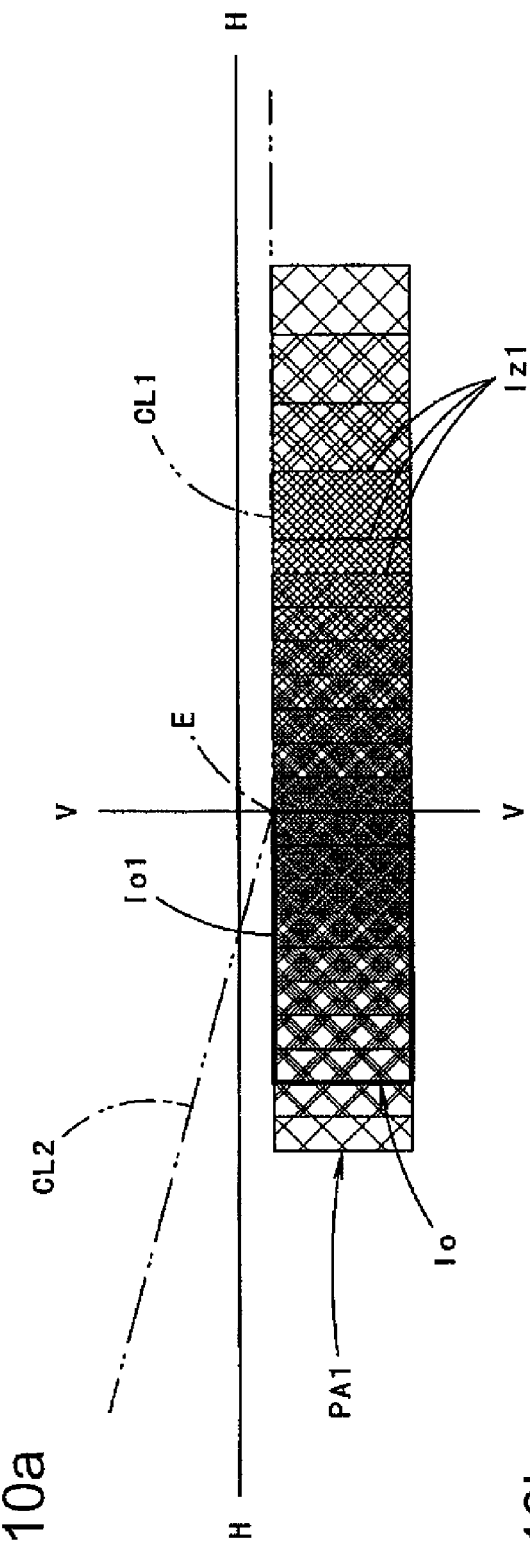
Figure 10B:
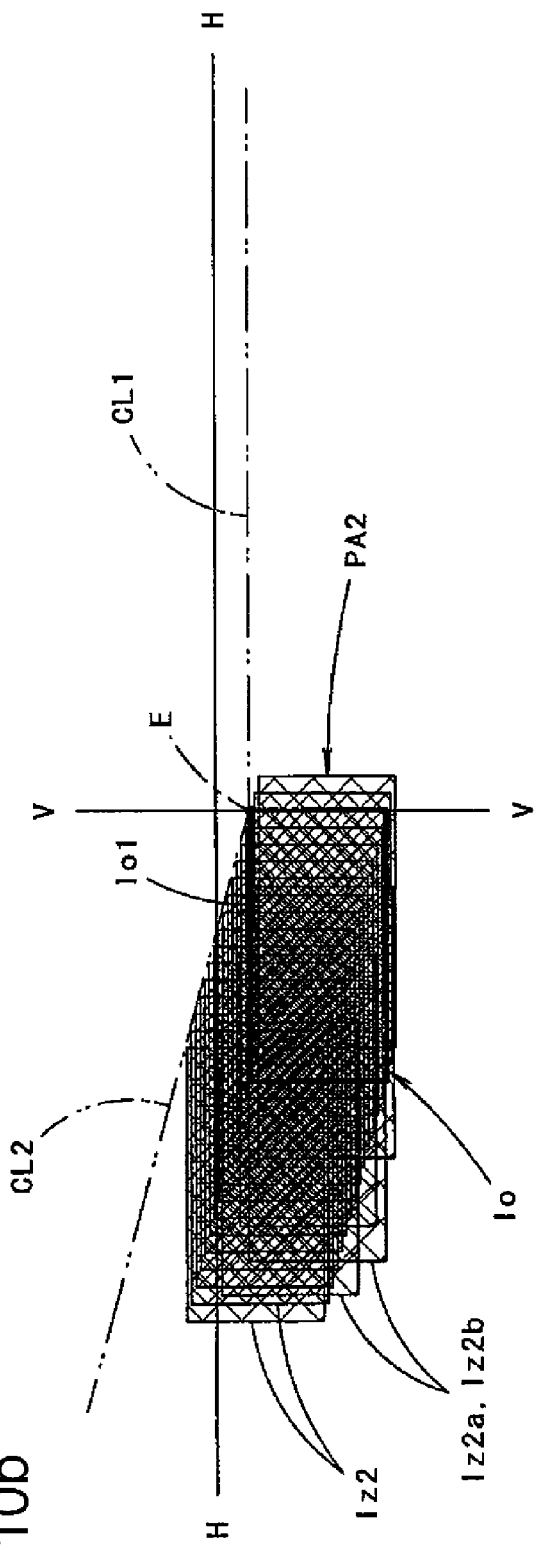
FIG. 10(b) is a drawing that shows, in detail, a second light distribution pattern that constitutes another part of the basic light distribution pattern.

FIG. 10(a) is a drawing that shows, in detail, the light distribution pattern PA1, whereas FIG. 10(b) is a drawing that shows, in detail, the light distribution pattern PA2.

As shown in these drawings, if the convex lens 12 were supposedly a regular plano convex aspherical lens, an inverted projection image to of the light emitting chip 14a would be formed on the aforementioned imaginary vertical screen in such a manner that the oncoming-traffic-lane-side end point of the upper end edge Io1 thereof would be positioned in the position of the elbow point E (i.e., the intersection of the imaginary vertical screen and the optical axis Ax), while the upper end edge Io1 would be positioned on a horizontal line that passes through the elbow point E. The reason is that the lower end edge 14a1 of the light emitting chip 14a would be positioned on a horizontal plane that includes the optical axis Ax and that the driving-lane-side end point of the lower end edge 14a1 would be positioned on the rear side focal point F of the convex lens 12. In such a case, because the lower end edge 14a1 of the light emitting chip 14a would extend in the horizontal direction from the rear side focal point F of the convex lens 12, the upper end edge Io1 of the inverted projection image to would have an extremely strong light/dark contrast.

In actuality, however, the front-side surface 12a of the convex lens 12 is configured so that the one region positioned on the oncoming-traffic lane side with respect to the vertical plane that includes the optical axis Ax is structured as the horizontal-direction diffusion region Z1, whereas the other region positioned on the driving lane side is structured as the oblique-direction diffusion region Z2. Thus, on the imaginary vertical screen, the light distribution pattern PA1 that extends in the horizontal direction will be formed by the light emitted from the horizontal-direction diffusion region Z1, as a light distribution pattern in which the inverted projection image Io is elongated in the horizontal direction. In addition, on the imaginary vertical screen, the light distribution pattern PA2 that extends in the aforementioned oblique direction will be formed by the light emitted from the oblique-direction diffusion region Z2, as a light distribution pattern in which the inverted projection image Io is elongated in an oblique direction that is inclined at the predetermined angle of θ upwardly with respect to the horizontal direction, toward the driving lane side.

In FIG. 10(a), the manner in which the light distribution pattern PA1 expands is indicated by superimposing a plurality of inverted projection images Iz1.

The light distribution pattern PA1 is formed as a light distribution pattern in which the inverted projection image Io of the light emitting chip 14a is elongated by a small amount to the left and is elongated by a large amount to the right, in terms of the horizontal direction. In such a case, the upper end edge Io1 of the inverted projection image Io is positioned on the horizontal line that passes through the elbow point E. Thus, the upper end edge of the light distribution pattern P1 has an extremely strong light/dark contrast. Consequently, it is possible to configure the horizontal cut-off line CL1 so as to be distinct.

On the other hand, in FIG. 10(b), the manner in which the light distribution pattern PA2 expands is indicated by superimposing a plurality of inverted projection images Iz2, Iz2a, and Iz2b.

The light distribution pattern PA2 is formed as a light distribution pattern in which the inverted projection image Io of the light emitting chip 14a is elongated by a small amount to the right and is elongated by a slightly large amount to the left, in terms of the aforementioned oblique direction. In such a case, the direction in which the upper end edge Io1 of the inverted projection image Io extends does not match the direction in which the inverted projection image to is elongated. Thus, the light/dark contrast of the upper end edge of the light distribution pattern PA2 is not as strong as that of the upper end edge of the light distribution pattern PA1. However, because the diffusion angle of the light distribution pattern PA2 is relatively small, the oblique cut-off line CL2 is distinct to some extent.

Of the plurality of inverted projection images Iz2 that structure the light distribution pattern PA2, an inverted projection image Iz2a and an inverted projection image Iz2b that are formed by the light emitted from the upper region Z2a and the lower region Z2b within the oblique-direction diffusion region Z2 are positioned slightly below the oblique cut-off line CL2. The reason is that the light emitted from the upper region Z2a and the lower region Z2b is light that is diffused downwardly.

On the other hand, as shown in FIG. 9(b), the additional light distribution pattern PB is formed as a horizontally oblong light distribution pattern that narrowly extends both to the left and to the right of the V-V line, in a position that is below and in the proximity of the horizontal cut-off line CL1. The upper end edge of the additional light distribution pattern PB is positioned generally at the same height as the horizontal cut-off line CL1.

The additional light distribution pattern PB has a shape that is obtained by shifting downward the position of a reference light distribution pattern PBo indicated with a dashed double-dotted line in FIG. 9(b) and further horizontally expanding the reference light distribution pattern PBo both to the left and to the right. In the present example, the reference light distribution pattern PBo is a distribution pattern that would be formed if the emission plane 22a of the additional lens 22 were supposedly structured with a curved plane that could cause the light that has been internally reflected on the reflecting plane 22c of the additional lens 22 and has reached the emission plane 22a to be emitted as light being parallel to the axial line Ax1 (in other words, if the emission plane 22a were supposedly structured with a curved plane that were rotationally symmetric with respect to the axial line Ax1). The reference light distribution pattern PBo is formed as a spot-like light distribution pattern centered on the elbow point E.

In actuality, however, the emission plane 22a of the additional lens 22 is structured with a continuously curved plane so that the lower region thereof is more inclined to the front, outwardly in terms of the radial direction of the axial line Ax1 than the upper region thereof is and so that the left-side region and the right-side region thereof are even more inclined to the front, outwardly in terms of the radial direction of the axial line Ax1 than the lower region thereof is. As a result the additional light distribution pattern PB has the shape that is obtained by shifting downward the position of the reference light distribution pattern PBo and further horizontally expanding the reference light distribution pattern PBo both to the left and to the right. Consequently, the additional light distribution pattern PB is formed as a horizontally oblong light distribution pattern that has a relatively small width in the up-and-down direction and is relatively bright, in a position that is below and in the proximity of the horizontal cut-off line CL1.

As a result, as shown in FIG. 8, the additional light distribution pattern PB is formed as a light distribution pattern that partially overlaps the basic light distribution pattern PA so as to be smoothly joined with the basic light distribution pattern PA and that reinforces the brightness in the areas below and on both the left and right sides of the basic light distribution pattern PA.

A light distribution pattern PBo' indicated with a broken line in FIG. 9(b) is a light distribution pattern that would be formed if the incident plane 22b, the reflecting plane 22c, and the emission plane 22a of the additional lens 22 were structured as curved planes that were rotationally symmetric with respect to the optical axis Ax, unlike the curved plane that is rotationally symmetric with respect to the axial line Ax1 and has been described as the shape on which the formation of the reference light distribution pattern PBo is based. The light distribution pattern PBo' is formed as a spot-like light distribution pattern centered on the elbow point E, like the reference light distribution pattern PBo. However, the spot diameter of the light distribution pattern PBo' is considerably larger than the spot diameter of the reference light distribution pattern PBo. Also, the light intensity at the center of the light distribution pattern PBo' is considerably lower than the light intensity at the center of the reference light distribution pattern PBo. Thus, in the case in which an additional light distribution pattern is formed while using the distribution pattern PBo' as a reference light distribution pattern, it is not possible to form the additional light distribution pattern like the additional light distribution pattern PB, which is a horizontally oblong light distribution pattern that has a relatively small width in the up-and-down direction and is relatively bright, in a position that is below and in the proximity of the horizontal cut-off line CL1.

As explained in detail above, the vehicular illumination lamp 10 according to the present embodiment is configured so as to form, as a part of the low-beam distribution pattern PL1, the basic light distribution pattern PA having the horizontal cut-off line CL1 and the oblique cut-off line CL2 in the upper end portion thereof, by exercising the deflection control, with the use of the convex lens 12, over the light directly emitted from the light emitting element 14 that includes the light emitting chip 14a having the rectangular light emitting surface. The light emitting element 14 is positioned facing forward in such a manner that the lower end edge 14a1 of the light emitting chip 14a is positioned on the horizontal plane that includes the optical axis Ax, while the driving-lane-side end point of the lower end edge 14a1 is positioned on the rear side focal point F of the convex lens 12. The convex lens 12 is configured so that the one partial region of the front-side surface 12a is structured as the horizontal-direction diffusion region Z1, while the other partial region of the front-side surface 12a is structured as the oblique-direction diffusion region Z2. As a result, it is possible to achieve one or more of the effects described below.

The light emitting element 14 is positioned facing forward in the proximity of the rear side focal point F of the convex lens 12. Thus, the inverted projection image Io of the light emitting chip 14a will be formed on the imaginary vertical screen in front of the lamp. In such a case, the light emitting chip 14a is positioned in such a manner that the lower end edge 14a1 thereof is positioned on the horizontal plane that includes the optical axis Ax, whereas the driving-lane-side end point of the lower end edge 14a1 is positioned on the rear side focal point F of the convex lens 12. Thus, if the convex lens 12 were supposedly a regular plano convex aspherical lens, the inverted projection image Io of the light emitting chip 14a would be formed on the aforementioned imaginary vertical screen in such a manner that the oncoming-traffic-lane-side end point of the upper end edge Io1 thereof would be positioned at the intersection of the imaginary vertical screen and the optical axis Ax, while the upper end edge Io1 would be positioned on the horizontal line that passes through the intersection.

In actuality, however, the convex lens 12 is configured so that the one partial region of the front-side surface 12a is structured as the horizontal-direction diffusion region Z1 that causes the light that has been emitted from the light emitting element 14 and has reached the region Z1 to be emitted as the light that is diffused in the horizontal direction, whereas the other partial region of the front-side surface 12a is structured as the oblique-direction diffusion region Z2 that causes the light that has been emitted from the light emitting element 14 and has reached the region Z2 to be emitted as the light that is diffused in the oblique direction that is inclined at the predetermined angle of $\theta$ upwardly with respect to the horizontal direction toward the driving lane side. Thus, on the imaginary vertical screen, the light distribution pattern PA1 that extends in the horizontal direction will be formed by the light emitted from the horizontal-direction diffusion region Z1, whereas the light distribution pattern PA2 that extends in the oblique direction that is inclined at the predetermined angle of $\theta$ upwardly with respect to the horizontal direction toward the driving lane side will be formed by the light emitted from the oblique-direction diffusion region Z2.

Accordingly, the basic light distribution pattern PA having the horizontal cut-off line CL1 and the oblique cut-off line CL2 in the upper end portion thereof is formed, as the combined light distribution pattern in which the light distribution patterns PA1 and PA2 are combined In such a case, the light distribution pattern PA1 is formed as the light distribution pattern in which the inverted projection image Io of the light emitting chip 14a is elongated in the horizontal direction. The lower end edge 14a of the light emitting chip 14a extends in the horizontal direction from the rear side focal point F of the convex lens 12. Thus, the upper end edge of the light distribution pattern PA1 has an extremely strong light/dark contrast. Consequently, it is possible to configure the horizontal cut-off line CL1 so as to be distinct.

Further according to the present embodiment, unlike the example of the related art, it is possible to form the horizontal cut-off line CL1 and the oblique cut-off line CL2 without having to block a part of the light directly emitted from the light emitting element 14 by using a shade. Thus, it is possible to effectively utilize the luminous flux from the light source.

In particular, according to the present embodiment, the convex lens 12 is configured so that the one region of the front-side surface 12a that is positioned on the oncoming-traffic lane side with respect to the vertical plane that includes the optical axis Ax is structured as the horizontal-direction diffusion region Z1, whereas the other region of the front-side surface 12a that is positioned on the driving lane side is structured as the oblique-direction diffusion region Z2. Thus, it is possible to achieve one or more of the effects described below.

From the standpoint of forming the horizontal cut-off line CL1 that has a certain sufficient length, it is preferable to structure the horizontal-direction diffusion region Z1 so that the amount of emitted light travelling toward the oncoming-traffic lane side is larger than the amount of emitted light travelling toward the driving lane side. In such a case, if a region that is positioned on the driving lane side with respect to the vertical plane that includes the optical axis Ax were supposedly structured as the horizontal-direction diffusion region Z1, the proportion of the light that is internally reflected on the front-side surface 12a would become large, because the refraction angle of the emitted light on the front-side surface 12a of the convex lens 12 would become large. Thus, the luminous flux from the light source would be lost by the corresponding amount. On the contrary, in the case where the region that is positioned on the oncoming-traffic lane side with respect to the vertical plane that includes the optical axis Ax is structured as the horizontal-direction diffusion region Z1, the proportion of the light that is internally reflected on the front-side surface 12a would become small, because the refraction angle of the emitted light on the front-side surface 12a of the convex lens 12 would become small. Thus, it is possible to enhance the utilization efficiency of the luminous flux from the light source.

Similarly, from the standpoint of forming the oblique cut-off line CL2 that has a certain sufficient length, it is preferable to structure the oblique-direction diffusion region Z2 so that the amount of emitted light travelling toward the driving lane side is larger than the amount of emitted light travelling toward the oncoming-traffic lane side. In this situation, if a region that is positioned on the oncoming-traffic lane side with respect to the vertical plane that includes the optical axis Ax were supposedly structured as the oblique-direction diffusion region Z2, the proportion of the light that is internally reflected on the front-side surface 12a would become large, because the refraction angle of the emitted light on the front-side surface 12a of the convex lens 12 would become large. Thus, the luminous flux from the light source would be lost by the corresponding amount. On the contrary, in the case where the region that is positioned on the driving lane side with respect to the vertical plane that includes the optical axis Ax is structured as the oblique-direction diffusion region Z2, the proportion of the light that is internally reflected on the front-side surface 12a would become small, because the refraction angle of the emitted light on the front-side surface 12a of the convex lens 12 would become small. Thus, it is possible to enhance the utilization efficiency of the luminous flux from the light source.

In addition, according to the present embodiment, the parts of the oblique-direction diffusion region Z2 are structured as the downward diffusion regions Z2a and Z2b that cause the light that has been emitted from the light emitting element and has reached the region Z2 to be emitted as the light that is diffused downwardly. Thus, it is possible to increase the brightness in such a part of the low-beam distribution pattern PL1 that ranges from the elbow point E to a position that is slightly on the driving lane side. Consequently, it is possible to easily form the hot zone HZ with a desired size and a desired shape.

In addition to these arrangements, the vehicular illumination lamp 10 according to the present embodiment is configured so that the additional lens 22 is provided around the convex lens 12, the additional lens 22 being integrally formed with the convex lens 12 in such a manner that the additional lens 22 surrounds the convex lens 12 in the manner of a band. The additional lens 22 has: the incident plane 22b that is formed generally in the shape of a circular cylindrical plane centered on the axial line Ax1 passing through the light emission center O of the light emitting element 14 and being parallel to the optical axis Ax and that causes the light emitted from the light emitting element 14 to become incident to the additional lens 22 in such a manner that the light is refracted into a direction to draw apart from the axial line Ax1; the reflecting plane 22c that causes the light that has become incident from the incident plane 22b to be internally reflected to the front; and the emission plane 22a that causes the light that has been internally reflected on the reflecting plane 22c to be emitted to the front as the diffused light. As a result, it is possible to achieve one or more of the effects described below.

In the additional lens 22, the incident plane 22b is formed generally in the shape of a circular cylindrical plane centered on the axial line Ax1 that passes through the light emission center O of the light emitting element 14 and is parallel to the optical axis Ax. Thus, of the light emitted from the light emitting element 14, it is possible to cause a large part of the light that travels toward the space surrounding the convex lens 12 to become incident to the additional lens 22 and to be emitted to the front via the reflecting plane 22c and the emission plane 22a. As a result, it is possible to additionally form the additional light distribution pattern PB with the light emitted through the additional lens 22, in addition to the basic light distribution pattern PA that is formed by the light emitted through the convex lens 12. Consequently, it is possible to utilize the luminous flux from the light source more effectively.

In such a case, the additional lens 22 is integrally formed with the convex lens 12 in such a manner that the additional lens 22 surrounds the convex lens 12 in the manner of a band. Thus, it is possible to maintain the positional relationship between the additional lens 22 and the convex lens 12 so as to be constant at all times. Consequently, it is possible to exercise the deflection control over the light emitted from the light emitting element 14 with the use of the additional lens 22, with a high level of precision.

Further, the incident plane 22b of the additional lens 22 is formed generally in the shape of a circular cylindrical plane centered on the axial line Ax1 that passes through the light emission center O of the light emitting element 14 and is parallel to the optical axis Ax. Thus, it is possible to make the size of the reference light distribution pattern PBo the smallest, the reference light distribution pattern PBo being formed in the case where the light emitted through the emission plane 22a is supposedly configured so as to become parallel beams travelling along the axial line Ax1. Accordingly, by exercising the diffusion control on the emission plane 22a of the additional lens 22 in an appropriate manner, it is possible to easily form the additional light distribution pattern PB having an arbitrary size and an arbitrary shape.

As explained above, according to the present embodiment, it is possible to enhance the utilization efficiency of the luminous flux from the light source in the direct projection type of vehicular illumination lamp 10 that uses the light emitting element 14 as the light source, even in the case where the basic light distribution pattern PA having the horizontal cut-off line CL1 and the oblique-cut-off line CL2 in the upper portion thereof is formed. In addition, it is possible to further enhance the utilization efficiency of the luminous flux from the light source by additionally forming the additional light distribution pattern PB.

Further, according to the present embodiment, the emitted light control is exercised on the emission plane 22a of the additional lens 22 so as to cause the light that has been internally reflected on the reflecting plane 22b of the additional lens 22 to be emitted as the diffused light that is diffused to the front downwardly and horizontally. Thus, it is possible to form the additional light distribution pattern PB that is diffused to the left and to the right, in a position that is below and in the proximity of the horizontal cut-off line CL1 and the oblique cut-off line CL2. In this situation, the additional light distribution pattern PB is formed by shifting downward the position of the reference light distribution pattern PBo, which is the smallest and spot-like, and further horizontally expanding the reference light distribution pattern PBo both to the left and to the right. Thus, it is possible to form the additional light distribution pattern PB as a horizontally oblong light distribution pattern that has a small width in the up-and-down direction. Consequently, it is possible to enhance the visibility in a distant area on the road surface in front of the vehicle.

In addition, the reflecting plane 22b of the additional lens 22 is formed so as to cause the light that has become incident from the incident plane 22b of the additional lens 22 to be internally reflected as the parallel beams within the plane that includes the axial line Ax1. Thus, it is possible to exercise the emitted light control on the emission plane 22a of the additional lens 22 with a high level of precision.

Further, the reflecting plane 22b of the additional lens 22 is structured as a total reflection plane that causes the light that has become incident from the incident plane 22b of the additional lens 22 to be totally reflected. Thus, it is possible to eliminate the need to apply mirror surface processing to the surface of the additional lens 22. Consequently, it is possible to reduce the cost of the vehicular illumination lamp 10.

In addition, the emission plane 22a of the additional lens 22 is positioned farther to the front than the rear-side surface 12b of the convex lens 12 is. Thus, it is possible to extend the reflecting plane 22b of the additional lens 22 to the front by the corresponding distance. As a result, it is possible to cause a large part of the light that has become incident from the incident plane 22b of the additional lens 22 to be internally reflected on the reflecting plane 22b. Consequently, it is possible to further enhance the utilization efficiency of the luminous flux from the light source.

Further, the diameter of the front end edge 22b1 of the incident plane 22b of the additional lens 22 is configured so as to be substantially equal to the diameter of the border line 12a1 between the front-side surface 12a of the convex lens 12 and the emission plane 22a of the additional lens 22. Thus, it is possible to cause substantially the total amount of the light that has been emitted from the light emitting element 14 and has been internally reflected on the reflecting plane 22b of the additional lens 22 to reach the emission plane 22a of the additional lens 22, without having to reduce the area that functions as the convex lens 12. Consequently, it is possible to even further enhance the utilization efficiency of the luminous flux from the light source.

In addition, according to the present embodiment, the outer circumferential plane 22d is formed on the outer circumference side of the reflecting plane 22b of the additional lens 22 throughout the range having the predetermined angle, the outer circumferential plane being formed generally in the shape of a circular cylindrical plane centered on the axial line Ax1. Also, the flange part 22e that projects in the direction orthogonal to the axial line Ax1 is formed on the outer circumferential plane 22d. Thus, it is possible to allow the additional lens 22 to be positioned with respect to, and to be supported by, the supporting member 18, with the use of the flange part 22e. In addition, it is possible to perform the positioning and the supporting processes, without making any impact on the optical functions of the convex lens 12 and the additional lens 22. Furthermore, in this situation, it is possible to position the additional lens 22 not only in terms of the front-back direction, but also, in terms of the up-and-down and the left-and-right directions within a plane that is orthogonal to the front-back direction and in terms of the rotation direction.

Next, a second embodiment of the present invention will be explained.

Figure 11:
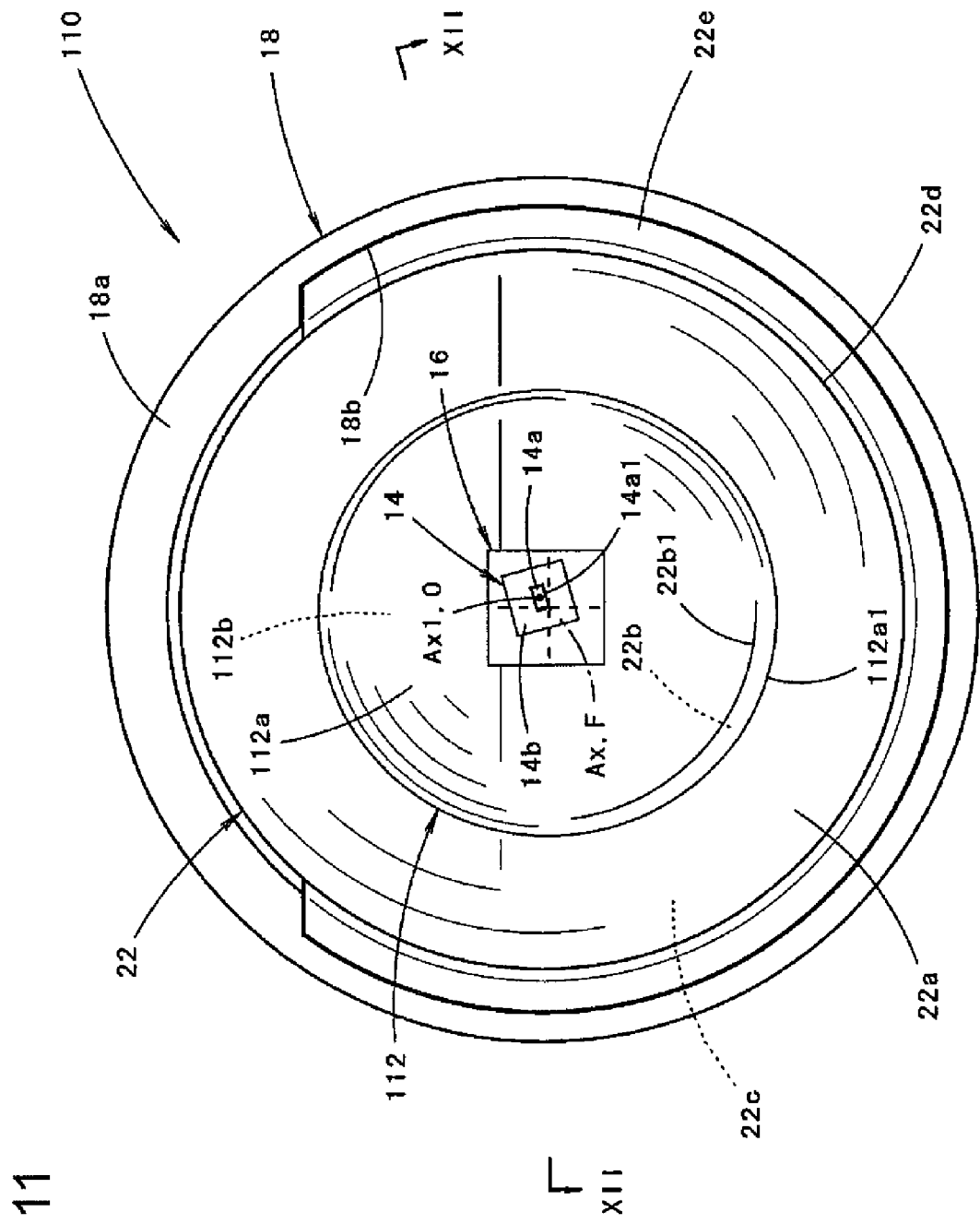
FIG. 11 is a front view of a vehicular illumination lamp according to a second embodiment of the present invention.
Figure 12:
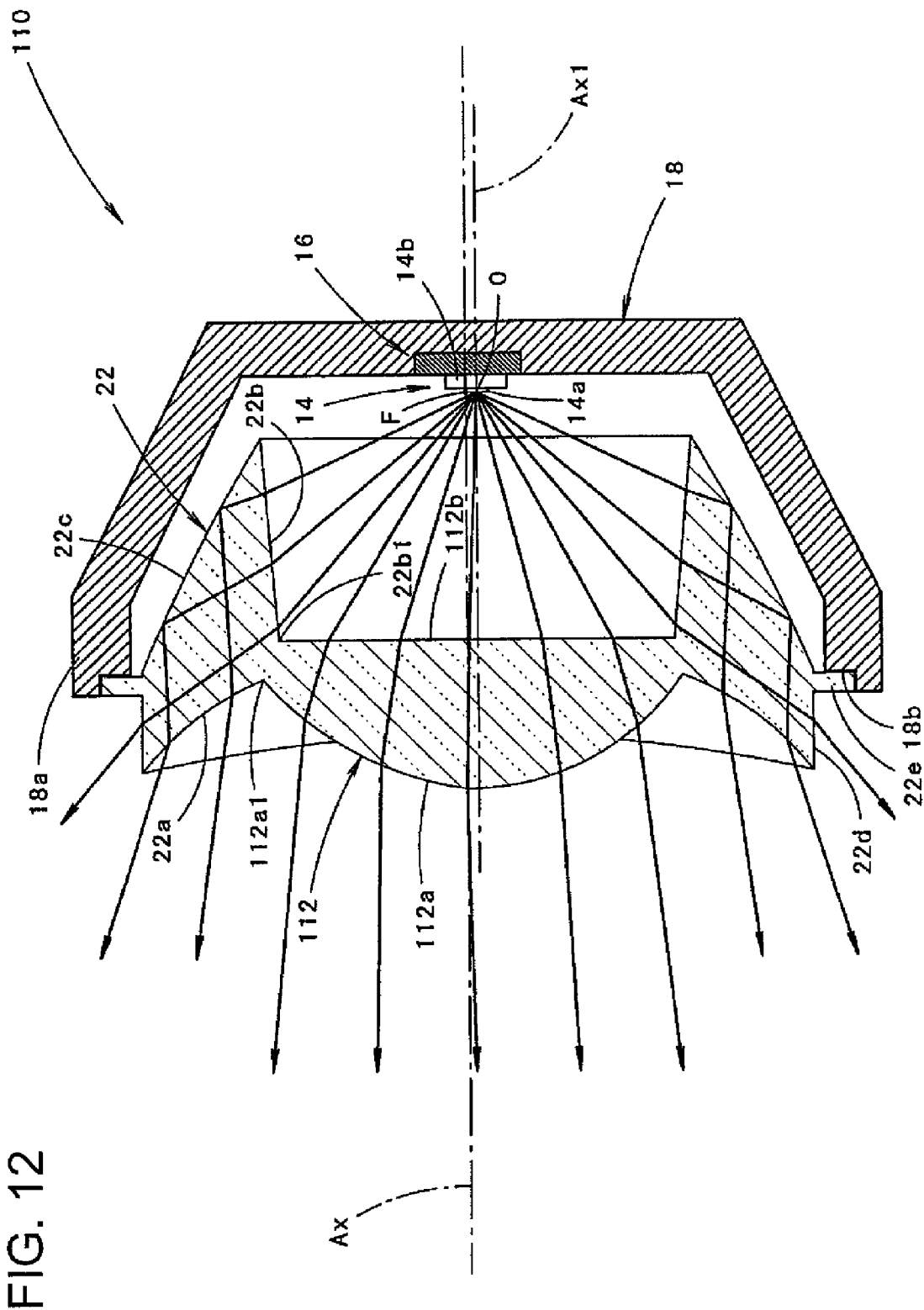
FIG. 12 is a cross-sectional view at the line XII-XII in FIG. 11.

FIG. 11 is a front view of a vehicular illumination lamp 110 according to a second embodiment of the present invention. FIG. 12 is a cross-sectional view at the line XII-XII in FIG. 11.

As shown in the drawings, the basic configuration of the vehicular illumination lamp 110 according to the present embodiment is the same as that of the vehicular illumination lamp 10 according to the first embodiment. However, the shape of the light emitting element 14 and the shape of a convex lens 112 are different from the examples according to the first embodiment. In accordance with these differences, the positional arrangement of the additional lens 22 is also different from the example according to the first embodiment.

In the vehicular illumination lamp 110 according to the present embodiment, the structure of the light emitting element 14 itself is the same as the example according to the first embodiment. However, the light emitting element 14 according to the present embodiment is positioned facing forward in such a manner that the lower end edge 14a1 of the light emitting chip 14a is positioned on an inclined plane that is inclined at a predetermined angle of $\theta$ (for example, $\theta=15°$) upwardly with respect to a horizontal plane that includes the optical axis Ax toward the driving lane side, while the oncoming-traffic-lane-side end point of the lower end edge 14a1 is positioned on the rear side focal point F of the convex lens 12.

Further, like the vehicular illumination lamp 10 according to the first embodiment, the vehicular illumination lamp 110 according to the present embodiment is also configured so as to be used as a lamp unit in a vehicular head lamp while being incorporated in a lamp body or the like (not shown in the drawings) in such a manner that the optical axis thereof is adjustable. When the adjustment of the optical axis thereof has been completed, the vehicular illumination lamp 110 is positioned in such a manner that the optical axis Ax extends in a downward direction at an angle of approximately 0.5 degrees to 0.6 degrees with respect to the vehicular longitudinal direction.

Like the convex lens 12 according to the first embodiment, the convex lens 112 according to the present embodiment is a convex lens having a shape like a plano convex aspherical lens in which the front-side surface 112a has a convex plane and the rear-side surface 112b has a flat plane. The convex lens 112 is positioned on the optical axis Ax. In this situation, the cross section of the front-side surface 112a of the convex lens 112 along the vertical plane that includes the optical axis Ax is a cross section of the front-side surface 112a of a plano convex aspherical lens; however, the cross sections other than the cross section along the vertical plane are somewhat different from the cross sections of the front-side surface 112a of a plano convex aspherical lens. Accordingly, more specifically, the rear side focal point F of the convex lens 112 denotes a rear side focal point within the vertical plane that includes the optical axis Ax. The details of the front-side surface 112a of the convex lens 112 will be described later.

According to the present embodiment also, the additional lens 22 has: the incident plane 22b that is formed generally in the shape of a circular cylindrical plane centered on the axial line Ax1 passing through the light emission center O of the light emitting element 14 and being parallel to the optical axis Ax and that causes the light that has been emitted from the light emitting element 14 to become incident to the additional lens 22 in such a manner that the light is refracted into a direction that draws apart from the axial line Ax1; the reflecting plane 22c that causes the light that has become incident from the incident plane 22b to be internally reflected to the front; and the emission plane 22a that causes the light that has been internally reflected on the reflecting plane 22c to be emitted to the front as diffused light.

The shapes of the incident plane 22b, the reflecting plane 22c, and the emission plane 22a of the additional lens 22 are the same as the examples according to the first embodiment. However, the positional relationship between the front end edge 22b1 of the incident plane 22b and a border line 112a1 between the front-side surface 112a of the convex lens 112 and the emission plane 22a of the additional lens 22 is shifted slightly to the right in a front view of the lamp, compared to the example according to the first embodiment. The reason is that the position of the light emission center O of the light emitting element 14 is shifted in the opposite direction in terms of the left-and-right direction from the example according to the first embodiment, with respect to the optical axis Ax. Thus, the position of the axial line Ax1 is parallel translated by an amount corresponding to the shift.

Figure 13:
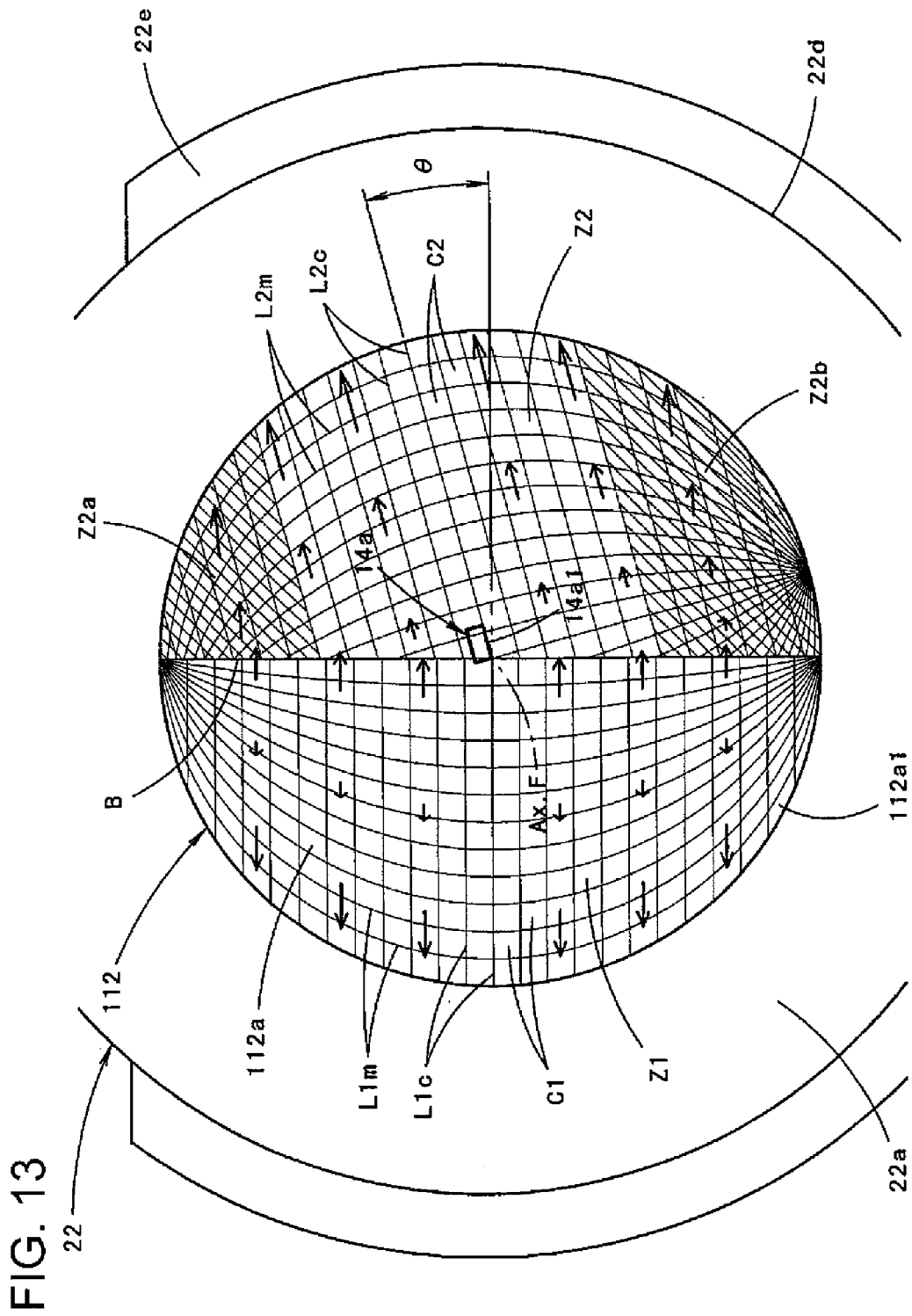
FIG. 13 is an enlarged view of an essential part in FIG. 11 in which a convex lens included in the vehicular illumination lamp according to the second embodiment is shown together with the light emitting chip.

FIG. 13 is an enlarged view of a related part in FIG. 11 in which the convex lens 112 according to the present embodiment is shown together with the light emitting chip 14a.

As shown in the drawing, like the convex lens 12 according to the first embodiment, of the front-side surface 112a of the convex lens 112, the entirety of one region that is positioned on the oncoming-traffic lane side with respect to the vertical plane that includes the optical axis Ax is structured as the horizontal-direction diffusion region Z1, whereas the entirety of the other region that is positioned on the driving lane side with respect to the vertical plane that includes the optical axis Ax is structured as an oblique-direction diffusion region Z2.

Like the example of the convex lens 12 according to the first embodiment, the horizontal-direction diffusion region Z1 is divided into the plurality of cells C1. The direction in which the light is emitted is specified for each of the cells C1.

More specifically, as shown with the arrows in FIG. 13, in some of the cells C1 that are positioned close to the border line B, the emitted light is directed to the left at a slightly large angle; in some of the cells C1 that are positioned close to the outer circumferential edge of the convex lens 112, the emitted light is directed to the right at a relatively large angle; and in some of the cells C1 that are positioned in between, the emitted light is directed into a direction in between. In this situation, the direction of the emitted light is gradually varied within the horizontal planes, in a step-by-step manner from the cells C1 that are positioned adjacent to the border line B to the cells C1 that are positioned adjacent to the outer circumferential edge of the convex lens 112.

On the other hand, like the example of the convex lens 12 according to the first embodiment, the oblique-direction diffusion region Z2 is divided into the plurality of cells C2. The direction in which the light is emitted is specified for each of the cells C2.

More specifically, as shown with the arrows in FIG. 13, in some of the cells C2 that are positioned close to the border line B, the emitted light is directed to the left at a small angle along the curved lines L2c; in some of the cells C2 that are positioned close to the outer circumferential edge of the convex lens 112, the emitted light is directed to the left at a somewhat large angle; and in some of the cells C2 that are positioned in between, the emitted light is directed into a direction in between. According to the present embodiment even in some of the cells C2 provided in a sector-shaped area defined by a curved line L2m extending obliquely downward from the optical axis Ax and the border line B, the emitted light is directed slightly to the left along the curved line L2c. In such a case, the direction of the emitted light is gradually varied within inclined planes that are inclined at an angle of θ with respect to the horizontal plane in a step-by-step manner from the cells C2 that are positioned adjacent to the border line B to the cells C2 that are positioned adjacent to the outer circumferential edge of the convex lens 112.

The oblique-direction diffusion region Z2 is configured, in the upper region Z2a and the lower region Z2b (shown with hatching in FIG. 13), so as to cause the light that has been emitted from the light emitting element 14 and has reached the region Z2 to be emitted as light that is diffused downwardly (more specifically, downwardly with respect to the aforementioned inclined planes). In such a case, each of the downward deflection amounts for the emitted light in the cells C2 is configured so that the closer the cell C2 is positioned to the upper end point of the border line B and the lower end point of a curved line L2m extending obliquely downward from the optical Axis Ax, the larger the deflection amount is.

Each of the arrows that extend from the center positions of the cells C1 and C2 in FIG. 13 indicates the direction in which the light is emitted from the corresponding one of the cells C1 and C2, the light having become incident to the convex lens 112 from the oncoming-traffic-lane-side end point (i.e., the position of the rear side focal point F of the convex lens 112) of the lower end edge 14a1 of the light emitting chip 14a.

As a result of configuring the front-side surface 112a of the convex lens 112 as described above, the front-side surface 112a has a surface shape having discontinuity at the border line B between the horizontal-direction diffusion region Z1 and the oblique-direction diffusion region Z2. The border line B is thus formed as a ridge line.

Figure 14:
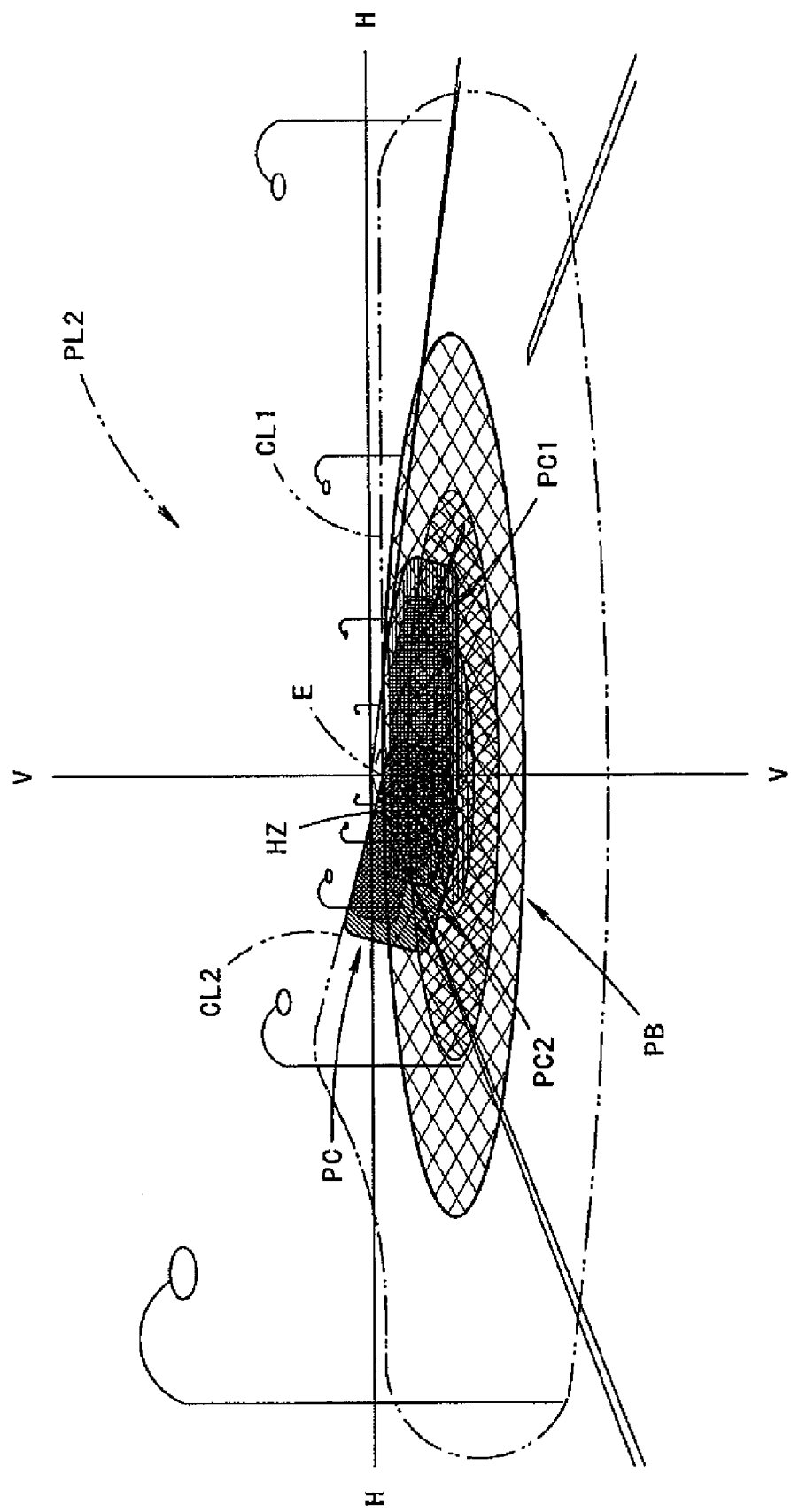
FIG. 14 is a drawing that perspectively shows a basic light distribution pattern and an additional light distribution pattern that are formed on the imaginary vertical screen by the light radiated to the front from the vehicular illumination lamp according to the second embodiment.

FIG. 14 is a drawing that perspectively shows a basic light distribution pattern PC and the additional light distribution pattern PB that will be formed on an imaginary vertical screen positioned 25 meters in front of the lamp, by the light radiated to the front from the vehicular illumination lamp 110 according to the present embodiment.

In the drawing, the basic light distribution pattern PC is a light distribution pattern that is formed by the light emitted through the convex lens 112, whereas the additional light distribution pattern PB is a light distribution pattern that is formed by the light emitted through the additional lens 22. A low-beam distribution pattern PL2 is formed as a combined light distribution pattern in which the basic light distribution pattern PC, the additional light distribution pattern PB, and one or more other light distribution patterns that are formed by the light radiated to the front from other lamp units (not shown in the drawings) are combined.

The low-beam distribution pattern PL2 is a low-beam distribution pattern for left-side light distribution and has a horizontal cut-off line CL1 and an oblique cut-off line CL2 in an upper end portion thereof. In this situation, with respect to the vertical line V-V that passes through the vanishing point H-V in the forward direction of the lamp, the horizontal cut-off line CL1 is formed on the oncoming-traffic lane side, whereas the oblique cut-off line CL2 is formed on the driving lane side. The elbow point E that is the intersection of the cut-off lines CL1 and CL2 is positioned below the vanishing point H-V in the forward direction of the lamp by approximately 0.5 degrees to 0.6 degrees. Further, in the low-beam distribution pattern PL2, the hot zone HZ, which is an area of high-intensity light, is formed so as to surround the elbow point E on the left side thereof.

The basic light distribution pattern PC is formed as a combined light distribution pattern in which a first light distribution pattern PC1 and a second light distribution pattern PC2 are combined.

The light distribution pattern PC1 is a light distribution pattern that is formed by the light emitted from the horizontal-direction diffusion region Z1. The light distribution pattern PC1 is formed so that the upper end edge thereof generally matches the horizontal cut-off line CL1. On the other hand, the light distribution pattern PC2 is a light distribution pattern that is formed by the light emitted from the oblique-direction diffusion region Z2. The light distribution pattern PC2 is formed so that the upper end edge thereof generally matches the oblique cut-off line CL2. Further, the hot zone HZ in the low-beam distribution pattern PL2 is formed generally in the area in which the two distribution patterns PC1 and PC2 overlap each other.

On the other hand, the additional light distribution pattern PB is the same as the example according to the first embodiment.

FIG. 15(a) is a drawing that shows, in detail, the light distribution pattern PC1 in the basic light distribution pattern PC, whereas FIG. 15(b) is a drawing that shows, in detail, the light distribution pattern PC2 in the basic light distribution pattern PC.

As shown in the drawings, if the convex lens 112 were supposedly a regular plano convex aspherical lens, an inverted projection image Io of the light emitting chip 14a would be formed on the aforementioned imaginary vertical screen in such a manner that the driving-lane-side end point of the upper end edge Io1 thereof would be positioned in the position of the elbow point E (i.e., the intersection of the imaginary vertical screen and the optical axis Ax), while the upper end edge Io1 would be positioned on an inclined line that passes through the elbow point E and is inclined at the predetermined angle of $\theta$ upwardly with respect to the horizontal line toward the driving lane side. The reason is that the lower end edge 14a1 of the light emitting chip 14a would be positioned on an inclined line that is inclined at the predetermined angle of $\theta$ (for example, $\theta=15°$) upwardly with respect to the horizontal line that includes the optical axis Ax toward the driving lane side and that the oncoming-traffic-lane-side end point of the lower end edge 14a1 would be positioned on the rear side focal point F of the convex lens 112.

In actuality, however, the front-side surface 112a of the convex lens 112 is configured so that the one region positioned on the oncoming-traffic lane side with respect to the vertical plane that includes the optical axis Ax is structured as the horizontal-direction diffusion region Z1, whereas the other region positioned on the driving lane side is structured as the oblique-direction diffusion region Z2. Thus, on the imaginary vertical screen, the light distribution pattern PC1 that extends in the horizontal direction will be formed by the light emitted from the horizontal-direction diffusion region Z1. In addition, on the imaginary vertical screen, the light distribution pattern PC2 in which the inverted projection image Io is elongated in an oblique direction that is inclined at the predetermined angle of $\theta$ upwardly with respect to the horizontal direction toward the driving lane side will be formed by the light emitted from the oblique-direction diffusion region Z2.

In FIG. 15(a), the manner in which the light distribution pattern PC1 expands is indicated by superimposing a plurality of inverted projection images Iz1.

The light distribution pattern PC1 is formed as a light distribution pattern in which the inverted projection image Io of the light emitting chip 14a is elongated both to the left and to the right in terms of the horizontal direction. In such a case, the direction in which the upper end edge Io1 of the inverted projection image Io extends does not match the direction in which the inverted projection image Io is elongated. Thus, the light/dark contrast of the upper end edge of the light distribution pattern PC1 is not as strong as that of the upper end edge of the light distribution pattern PC2 explained later; however, it is possible to achieve a sufficient level of distinction that allows the upper end edge to be recognized as the horizontal cut-off line CL1.

On the other hand, in FIG. 15(b), the manner in which the light distribution pattern PC2 expands is indicated by superimposing a plurality of inverted projection images Iz2, Iz2a, and Iz2b.

The light distribution pattern PC2 is formed as a light distribution pattern in which the inverted projection image Io of the light emitting chip 14a is elongated while being deflected to the left, in terms of the aforementioned oblique direction. In such a case, the upper end edge Io1 of the inverted projection image Io is positioned on an inclined line that passes through the elbow point E and is inclined at the predetermined angle of $\theta$ upwardly with respect to the horizontal line toward the driving lane side. Thus, the upper end edge of the light distribution pattern PC2 has an extremely strong light/dark contrast. Consequently, it is possible to configure the oblique cut-off line CL2 so as to be distinct.

Of the plurality of inverted projection images Iz2 that structure the light distribution pattern PC2, an inverted projection image IZ2a and an inverted projection image Iz2b that are formed by the light emitted from the upper region Z2a and the lower region Z2b within the oblique-direction diffusion region Z2 are positioned slightly below the oblique cut-off line CL2. The reason is that the light emitted from the upper region Z2a and the lower region Z2b is light that is diffused downwardly.

As explained above in detail, the vehicular illumination lamp 110 according to the present embodiment is also configured so as to form the basic light distribution pattern PC having the horizontal cut-off line CL1 and the oblique cut-off line CL2 in the upper end portion thereof, as a combined light distribution pattern in which the light distribution patterns PC1 and PC2 are combined.

In such a case, the light distribution pattern PC2 is formed as the light distribution pattern in which the inverted projection image Io of the light emitting chip 14a is elongated in the oblique direction that is inclined at the predetermined angle of $\theta$ upwardly with respect to the horizontal direction toward the driving lane side. On the other hand, the lower end edge 14a1 of the light emitting chip 14a extends from the rear side focal point F of the convex lens 112 in the oblique direction that is inclined at the predetermined angle of $\theta$ upwardly with respect to the horizontal direction toward the driving lane side. Thus, the upper end edge of the light distribution pattern PC2 has an extremely strong light/dark contrast. Consequently, it is possible to configure the oblique cut-off line CL2 so as to be distinct.

In addition, according to the present embodiment also, unlike the example of the related art, it is possible to form the horizontal cut-off line CL1 and the oblique cut-off line CL2 without having to block a part of the light directly emitted from the light emitting element 14 by using a shade. Thus, it is possible to effectively utilize the luminous flux from the light source.

Further, according to the present embodiment also, the convex lens 112 is configured so that the one region of the front-side surface 112a that is positioned on the oncoming-traffic lane side with respect to the vertical plane that includes the optical axis Ax is structured as the horizontal-direction diffusion region Z1, whereas the other region of the front-side surface 112a that is positioned on the driving lane side is structured as the oblique-direction diffusion region Z2. Thus, the proportion of the light that is internally reflected on the front-side surface 112a of the convex lens 112 is small. Consequently, it is possible to enhance the utilization efficiency of the luminous flux from the light source.

In addition, according to the present embodiment also, the parts of the oblique-direction diffusion region Z2 are structured as the downward diffusion regions Z2a and Z2b that cause the light that has been emitted from the light emitting element 14 and has reached the region Z2 to be emitted as the light that is diffused downwardly. Thus, it is possible to increase the brightness in such a part of the low-beam distribution pattern PL2 that ranges from the elbow point E to a position that is slightly on the driving lane side. Consequently, it is possible to easily form the hot zone HZ with a desired size and a desired shape.

In addition to these arrangements, like the vehicular illumination lamp 10 according to the first embodiment, the vehicular illumination lamp 110 according to the present embodiment is also configured so that the additional lens 22 is provided around the convex lens 112, the additional lens 22 being integrally formed with the convex lens 112 in such a manner that the additional lens 22 surrounds the convex lens 112 in the manner of a band. Thus, it is possible to form the additional light distribution pattern PB that is diffused to the left and to the right, in a position that is below and in the proximity of the horizontal cut-off line CL1 and the oblique cut-off line CL2. In this situation, it is possible to form the additional light distribution pattern PB as a horizontally oblong light distribution pattern that has a small width in the up-and-down direction. Consequently, it is possible to enhance the visibility in a distant area on the road surface in front of the vehicle.

As explained above, according to the present embodiment, it is possible to enhance the utilization efficiency of the luminous flux from the light source in the direct projection type of vehicular illumination lamp 110 that uses the light emitting element 14 as the light source, even in the case where the basic light distribution pattern PC having the horizontal cut-off line CL1 and the oblique cut-off line CL2 in the upper end portion thereof is formed. In addition, because the additional light distribution pattern PB is additionally formed, it is possible to further enhance the utilization efficiency of the luminous flux from the light source.

In the description of the embodiments above, the present invention is explained based on the assumption that the light emitting chip 14a of the light emitting element 14 has a horizontally oblong rectangular light emitting surface. However, those skilled in the art will appreciate that it is acceptable to use a light emitting chip that has a light emitting surface that is in the shape of a square or a vertically oblong rectangle.

Further, in the description of the embodiments above, the present invention is explained based on the assumption that the entirety of the one region that is positioned on the oncoming-traffic lane side with respect to the vertical plane that includes the optical axis Ax is structured as the horizontal-direction diffusion region Z1, whereas the entirety of the other region that is positioned on the driving lane side with respect to the vertical plane that includes the optical axis Ax is structured as the oblique-direction diffusion region Z2. It is, however, acceptable to configure a partial area in the horizontal-direction diffusion region Z1 or the oblique-direction diffusion region Z2 so as to be different from the rest of the region (e.g., The front-side surface in the partial area is maintained as the shape of the front-side surface of a regular plano convex aspherical lens, so that the inverted projection image Io is projected on the imaginary vertical screen as it is).

Further, in the description of the embodiments above, the present invention is explained based on the assumption that the rear-side surfaces 12b and 112b of the convex lenses 12 and 112 are each structured with a flat plane. However, it is acceptable to have another arrangement in which the rear-side surfaces 12b and 112b are each structured with a convex plane or a concave plane.

Furthermore, in the description of the embodiments above, the present invention is explained based on the assumption that the basic light distribution patterns PA and PC and the additional light distribution pattern PB that are formed by the light radiated from the vehicular illumination lamps 10 and 110 are formed as parts of the low-beam distribution patterns PL1 and PL2 for the left-side light distribution, respectively. However, even in the case where the basic light distribution patterns PA and PC and the additional light distribution pattern PB are formed as parts of low-beam distribution patterns for right-side light distribution, it is possible to achieve the effects that are the same as those in the embodiments described above by configuring each of the vehicular illumination lamps 10 and 110 so as to have an opposite structure in terms of the left and the right.

Moreover, it is also acceptable to incorporate both the vehicular illumination lamp 10 according to the first embodiment and the vehicular illumination lamp 110 according to the second embodiment into a vehicular head lamp together. In that situation, it is possible to obtain the distinct horizontal cut-off line CL1, from the basic light distribution pattern PA formed by the light radiated from the vehicular illumination lamp 10. In addition, it is also possible to obtain the distinct oblique cut-off line CL2, from the basic light distribution pattern PC formed by the light radiated from the vehicular illumination lamp 110.

In addition, in the description of the embodiments above, the present invention is explained based on the assumption that the additional light distribution pattern PB is formed by the light emitted through the additional lens 22 as the horizontally oblong light distribution pattern that has a small width in the up-and-down direction and that is diffused to the left and to the right in a position that is below and in the proximity of the horizontal cut-off line CL1 and the oblique cut-off line CL2. In such a case, however, it is also acceptable to have an arrangement in which a part of the light emitted through the additional lens 22 is radiated while being diffused upwardly, so as to form a light distribution pattern used for radiating light onto traffic signs provided up above on the road ahead of the vehicle.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

| | |
|---|---|
| 10, 110 | VEHICULAR ILLUMINATION LAMP |
| 12, 112 | CONVEX LENS |
| 12a, 112a | FRONT-SIDE SURFACE |
| 12a1, 112a1 | BORDER LINE |
| 12b, 112b | REAR-SIDE SURFACE |
| 14 | LIGHT EMITTING ELEMENT |
| 14a | LIGHT EMITTING CHIP |
| 14a1 | LOWER END EDGE |
| 14b | BASE PLATE |
| 16 | METAL PLATE |
| 18 | SUPPORTING MEMBER |
| 18a | RING PART |
| 18b | POSITIONING RECESSED PART |
| 22 | ADDITIONAL LENS |
| 22a | EMISSION PLANE |
| 22b | INCIDENT PLANE |
| 22b1 | FRONT END EDGE |
| 22c | REFLECTING PLANE |
| 22d | OUTER CIRCUMFERENTIAL PLANE |
| 22e | FLANGE PART |
| Ax | OPTICAL AXIS |
| Ax1 | AXIAL LINE |
| B | BORDER LINE |
| C1, C2 | CELL |
| CL1 | HORIZONTAL CUT-OFF LINE |
| CL2 | OBLIQUE CUT-OFF LINE |
| E | ELBOW PONT |
| F | REAR SIDE FOCAL POINT |
| HZ | HOT ZONE |
| Io | INVERTED PROJECTION IMAGE |
| Io1 | UPPER END EDGE |
| Iz1, Iz2, Iz2a, Iz2b | INVERTED PROJECTION IMAGE |
| L1c, L1m, L2c, L2m | CURVED LINE |
| O | LIGHT EMISSION CENTER |
| PA, PC | BASIC LIGHT DISTRIBUTION PATTERN |
| PA1, PC1 | FIRST LIGHT DISTRIBUTION PATTERN |
| PA2, PC2 | SECOND LIGHT DISTRIBUTION PATTERN |
| PB | ADDITIONAL LIGHT DISTRIBUTION PATTERN |
| PBo | REFERENCE LIGHT DISTRIBUTION PATTERN |
| PBo' | LIGHT DISTRIBUTION PATTERN |
| PL1, PL2 | LOW-BEAM DISTRIBUTION PATTERN |
| Z1 | HORIZONTAL-DIRECTION DIFFUSION REGION |
| Z2 | OBLIQUE-DIRECTION DIFFUSION REGION |
| Z2a | UPPER REGION |
| Z2b | LOWER REGION |

What is claimed is:

1. A vehicular illumination lamp comprising:
a convex lens positioned on an optical axis in a vehicular longitudinal direction;
a light emitting element positioned in a proximity of a rear side focal point of the convex lens; and
an additional lens provided around the convex lens;
wherein the vehicle lamp is configured so as to form a light distribution pattern that has a horizontal cut-off line and an oblique cut-off line in an upper end portion thereof by exercising deflection control, with a use of the convex lens, over light directly emitted from the light emitting element,
wherein the light emitting element comprises a light emitting chip that has a rectangular light emitting surface,
wherein the light emitting element is positioned facing forward in such a manner that a lower end edge of the light emitting chip is positioned on a plane that includes the optical axis, while one of end points of the lower end edge is positioned on the rear side focal point,
wherein the additional lens is integrally formed with the convex lens in such a manner that the additional lens surrounds the convex lens in a manner of a band, and
wherein the additional lens comprises:
an incident plane that is formed generally in a shape of a circular cylindrical plane centered on an axial line passing through a position in a proximity of a light emission center of the light emitting element and being parallel to the optical axis and that causes light emitted from the light emitting element to become incident to the additional lens in such a manner that the light is refracted into a direction that draws apart from the axial line;
a reflecting plane that causes the light that has become incident from the incident plane to be internally reflected to a front; and
an emission plane that causes the light that has been internally reflected on the reflecting plane to be emitted to the front as diffused light.

2. The vehicular illumination lamp according to claim 1, wherein the reflecting plane of the additional lens is formed so that the reflecting plane causes the light that has become incident from the incident plane of the additional lens to be internally reflected, as parallel beams on a plane that includes the axial line.

3. The vehicular illumination lamp according to claim 1, wherein the reflecting plane of the additional lens is structured as a total reflection plane that causes the light that has become incident from the incident plane of the additional lens to be totally reflected.

4. The vehicular illumination lamp according to claim 1, wherein the emission plane of the additional lens is positioned farther to the front than a rear-side surface of the convex lens is.

5. The vehicular illumination lamp according to claim 4, wherein a diameter of a front end edge of the incident plane of the additional lens is configured so as to be substantially equal to a diameter of a border line between a front-side surface of the convex lens and the emission plane of the additional lens.

6. The vehicular illumination lamp according to claim 1, wherein an outer circumferential plane is formed on an outer circumference side of the reflecting plane of the additional lens throughout a range having a predetermined angle, the outer circumferential plane being formed generally in a shape of a circular cylindrical plane centered on the axial line, and
wherein a flange part that projects in a direction orthogonal to the axial line is formed on the outer circumferential plane.

7. The vehicular illumination lamp according to claim 2, wherein the reflecting plane of the additional lens is structured as a total reflection plane that causes the light that has become incident from the incident plane of the additional lens to be totally reflected.

8. The vehicular illumination lamp according to claim 2, wherein the emission plane of the additional lens is positioned farther to the front than a rear-side surface of the convex lens is.

9. The vehicular illumination lamp according to claim 3, wherein the emission plane of the additional lens is positioned farther to the front than a rear-side surface of the convex lens is.

10. The vehicular illumination lamp according to claim 8, wherein a diameter of a front end edge of the incident plane of the additional lens is configured so as to be substantially equal to a diameter of a border line between a front-side surface of the convex lens and the emission plane of the additional lens.

11. The vehicular illumination lamp according to claim 9, wherein a diameter of a front end edge of the incident plane of the additional lens is configured so as to be substantially equal to a diameter of a border line between a front-side surface of the convex lens and the emission plane of the additional lens.

12. The vehicular illumination lamp according to claim 2, wherein an outer circumferential plane is formed on an outer circumference side of the reflecting plane of the additional lens throughout a range having a predetermined angle, the outer circumferential plane being formed generally in a shape of a circular cylindrical plane centered on the axial line, and wherein a flange part that projects in a direction orthogonal to the axial line is formed on the outer circumferential plane.

13. The vehicular illumination lamp according to claim 3, wherein an outer circumferential plane is formed on an outer circumference side of the reflecting plane of the additional lens throughout a range having a predetermined angle, the outer circumferential plane being formed generally in a shape of a circular cylindrical plane centered on the axial line, and wherein a flange part that projects in a direction orthogonal to the axial line is formed on the outer circumferential plane.

14. The vehicular illumination lamp according to claim 4, wherein an outer circumferential plane is formed on an outer circumference side of the reflecting plane of the additional lens throughout a range having a predetermined angle, the outer circumferential plane being formed generally in a shape of a circular cylindrical plane centered on the axial line, and wherein a flange part that projects in a direction orthogonal to the axial line is formed on the outer circumferential plane.

15. The vehicular illumination lamp according to claim 5, wherein an outer circumferential plane is formed on an outer circumference side of the reflecting plane of the additional lens throughout a range having a predetermined angle, the outer circumferential plane being formed generally in a shape of a circular cylindrical plane centered on the axial line, and wherein a flange part that projects in a direction orthogonal to the axial line is formed on the outer circumferential plane.

16. A method of forming a vehicular illumination lamp comprising:

positioning a convex lens on an optical axis in a vehicular longitudinal direction;

positioning a light emitting element in a proximity of a rear side focal point of the convex lens; and providing an additional lens around the convex lens;

wherein the vehicle lamp is configured so as to form a light distribution pattern that has a horizontal cut-off line and an oblique cut-off line in an upper end portion thereof by exercising deflection control, with a use of the convex lens, over light directly emitted from the light emitting element, wherein the light emitting element comprises a light emitting chip that has a rectangular light emitting surface, wherein the light emitting element is positioned facing forward in such a manner that a lower end edge of the light emitting chip is positioned on a plane that includes the optical axis, while one of end points of the lower end edge is positioned on the rear side focal point, wherein the additional lens is integrally formed with the convex lens in such a manner that the additional lens surrounds the convex lens in a manner of a band, and wherein the additional lens comprises:

an incident plane that is formed generally in a shape of a circular cylindrical plane centered on an axial line passing through a position in a proximity of a light emission center of the light emitting element and being parallel to the optical axis and that causes light emitted from the light emitting element to become incident to the additional lens in such a manner that the light is refracted into a direction that draws apart from the axial line;

a reflecting plane that causes the light that has become incident from the incident plane to be internally reflected to a front; and an emission plane that causes the light that has been internally reflected on the reflecting plane to be emitted to the front as diffused light.

\* \* \* \* \*